(12) United States Patent
Dykstra

(10) Patent No.: US 11,338,344 B1
(45) Date of Patent: *May 24, 2022

(54) TOOL AND SHELL USING INDUCTION HEATING

(71) Applicant: Temper IP, LLC, Rockford, MI (US)

(72) Inventor: William C. Dykstra, Rockford, MI (US)

(73) Assignee: TEMPER IP, LLC, Rockford, MI (US)

( * ) Notice: Subject to any disclaimer, the term of this patent is extended or adjusted under 35 U.S.C. 154(b) by 335 days.

This patent is subject to a terminal disclaimer.

(21) Appl. No.: 16/430,491

(22) Filed: Jun. 4, 2019

Related U.S. Application Data

(60) Continuation of application No. 14/834,834, filed on Aug. 25, 2015, now Pat. No. 10,307,810, which is a
(Continued)

(51) Int. Cl.
*B21D 22/02* (2006.01)
*B21D 26/02* (2011.01)
(Continued)

(52) U.S. Cl.
CPC .......... *B21D 22/022* (2013.01); *B21D 26/02* (2013.01); *B21D 35/006* (2013.01); *B21D 37/16* (2013.01); *B33Y 80/00* (2014.12)

(58) Field of Classification Search
CPC ........ B21D 37/00; B21D 37/01; B21D 37/04; B21D 37/16; B21D 22/022; B21D 22/208;
(Continued)

(56) References Cited

U.S. PATENT DOCUMENTS 2,317,597 A   4/1943   Ford et al.
2,461,323 A   2/1949   Hille
(Continued)

FOREIGN PATENT DOCUMENTS

DE   102007056357 A1 *   5/2009   ............ B21D 37/20
JP   3295188 B2   12/1991
(Continued)

OTHER PUBLICATIONS

Darina Manova et al., Thin Film Deposition Using Energetic Ions, Jul. 29, 2010, Materials (Year: 2010).*
(Continued)

*Primary Examiner* — Adam J Eiseman
*Assistant Examiner* — Katie L. Parr
(74) *Attorney, Agent, or Firm* — Honigman LLP

(57) ABSTRACT

A component forming tool for forming a component from a blank includes a die forming shell for forming the component from the blank. A first shell portion of the die forming shell is located on a first set of support elements and a second shell portion is located on a second set of support elements. The tool includes at least one induction heating coil for induction heating of a workpiece disposed within a cavity formed by the first and second shell portions. The first set of support elements include multi-material support elements having at least two layers of different materials and the second set of support elements include multi-material support elements having at least two layers of different materials.

40 Claims, 19 Drawing Sheets

Related U.S. Application Data division of application No. 13/899,953, filed on May 22, 2013, now Pat. No. 9,174,263.

(60) Provisional application No. 61/650,672, filed on May 23, 2012.

(51) Int. Cl.
  *B21D 37/16* (2006.01)
  *B21D 35/00* (2006.01)
  *B33Y 80/00* (2015.01)

(58) Field of Classification Search
  CPC ...... B21D 26/02; B21D 35/00; B21D 35/006; B21D 37/02; B21D 37/20; B21D 22/06; B21D 24/04; C21D 1/42; C21D 1/673
  USPC .................................... 72/342.1, 342.96
  See application file for complete search history.

(56) References Cited

U.S. PATENT DOCUMENTS

| | | | |
|---|---|---|---|
| 2,755,689 A | 7/1956 | Sundback | |
| 2,852,649 A | 9/1958 | Limpel | |
| 3,126,937 A | 3/1964 | Brower et al. | |
| 3,250,104 A | 5/1966 | Fischer | |
| 3,605,477 A | 9/1971 | Carlson | |
| 3,679,807 A | 7/1972 | Carcey | |
| 3,972,744 A | 8/1976 | Cantrell | |
| 4,088,046 A * | 5/1978 | Severinsson | B21D 37/20 156/155 |
| 4,437,326 A | 3/1984 | Carlson | |
| 4,496,131 A | 1/1985 | Yang | |
| 4,569,218 A | 2/1986 | Baker et al. | |
| 4,659,056 A | 4/1987 | Michaud-Soret | |
| 5,040,399 A | 8/1991 | Knapper et al. | |
| 5,338,497 A * | 8/1994 | Murray | B29C 33/08 264/257 |
| 5,410,132 A | 4/1995 | Gregg et al. | |
| 5,530,227 A | 6/1996 | Matsen et al. | |
| 5,645,744 A | 7/1997 | Matsen et al. | |
| 5,682,783 A | 11/1997 | Creamer et al. | |
| 5,683,608 A | 11/1997 | Matsen et al. | |
| 5,699,693 A | 12/1997 | Nogami et al. | |
| 5,749,256 A | 5/1998 | Bodnar | |
| 5,960,658 A * | 10/1999 | Hudson | B21D 26/033 72/61 |
| 5,989,008 A * | 11/1999 | Wytkin | B29C 33/02 249/78 |
| 5,992,197 A * | 11/1999 | Freeman | B21D 26/033 29/421.1 |
| 6,322,645 B1 | 11/2001 | Dykstra et al. | |
| 6,576,877 B2 | 6/2003 | Dabelstein et al. | |
| 6,613,164 B2 | 9/2003 | Dykstra et al. | |
| 6,694,597 B2 | 2/2004 | Wang et al. | |
| 6,810,709 B2 | 11/2004 | Hammar et al. | |
| 6,921,444 B2 | 7/2005 | Joaquin et al. | |
| 7,003,996 B2 | 2/2006 | Dykstra et al. | |
| 7,024,897 B2 * | 4/2006 | Pfaffmann | B21D 26/033 148/520 |
| 7,159,437 B2 | 1/2007 | Schroth et al. | |
| 7,269,986 B2 | 9/2007 | Pfaffmann et al. | |
| 7,305,860 B2 | 12/2007 | Yang et al. | |
| 7,645,104 B2 | 1/2010 | Denham et al. | |
| 7,777,600 B2 | 8/2010 | Brooks | |
| 8,336,359 B2 | 12/2012 | Werz | |
| 8,381,562 B2 | 2/2013 | Schroth et al. | |
| 8,479,552 B1 | 7/2013 | Dykstra | |
| 8,480,823 B1 * | 7/2013 | Matsen | B29C 70/46 148/574 |
| 8,511,126 B2 | 8/2013 | Mathweis et al. | |
| 9,061,240 B2 | 6/2015 | Sommier et al. | |
| 9,061,340 B2 | 6/2015 | Lee et al. | |
| 9,174,263 B2 | 11/2015 | Dykstra | |
| 9,623,476 B2 * | 4/2017 | Choda | B21J 13/03 |
| 10,307,810 B1 | 6/2019 | Dykstra | |
| 2003/0106877 A1 * | 6/2003 | Miyasaka | B21D 37/20 219/78.02 |
| 2005/0281632 A1 | 12/2005 | Donhauser | |
| 2006/0107716 A1 | 5/2006 | Dykstra et al. | |
| 2010/0018271 A1 * | 1/2010 | Matsen | B21D 26/031 72/19.1 |
| 2010/0083480 A1 | 4/2010 | Carter | |
| 2010/0083481 A1 | 4/2010 | Luo et al. | |
| 2011/0030442 A1 * | 2/2011 | Lety | C21D 1/62 72/342.94 |
| 2013/0240189 A1 | 9/2013 | Huang et al. | |

FOREIGN PATENT DOCUMENTS

| | | |
|---|---|---|
| JP | 6297049 B2 | 10/1994 |
| KR | 2005070346 | 7/2005 |

OTHER PUBLICATIONS

Polymer Plastics Corporation, G-10/FR-4 Epoxy, Aug. 16, 2000, Polymer Plastics Corporation, https://web.archive.org/web/20000816204107/http://www.polymerplastics.com/composite_g10.shtml (Year: 2000).*

Polymer Plastics Corporation, G-11 Epoxy, Aug. 16, 2000, Polymer Plastics Corporation, https://web.archive.org/web/20000816204042/ https://www.polymerplastics.com/composite_g11.shtml (Year: 2000).*

* cited by examiner

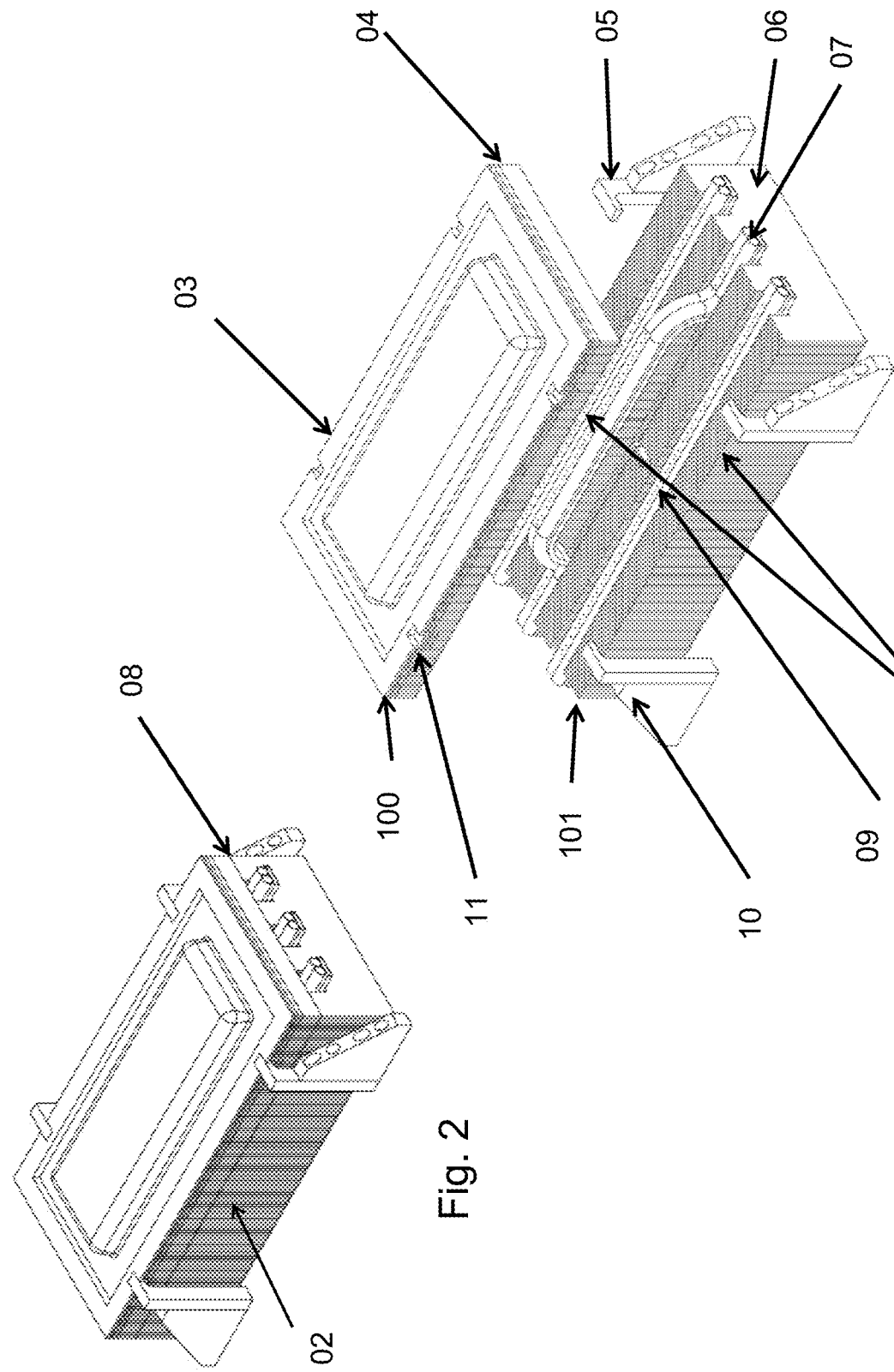

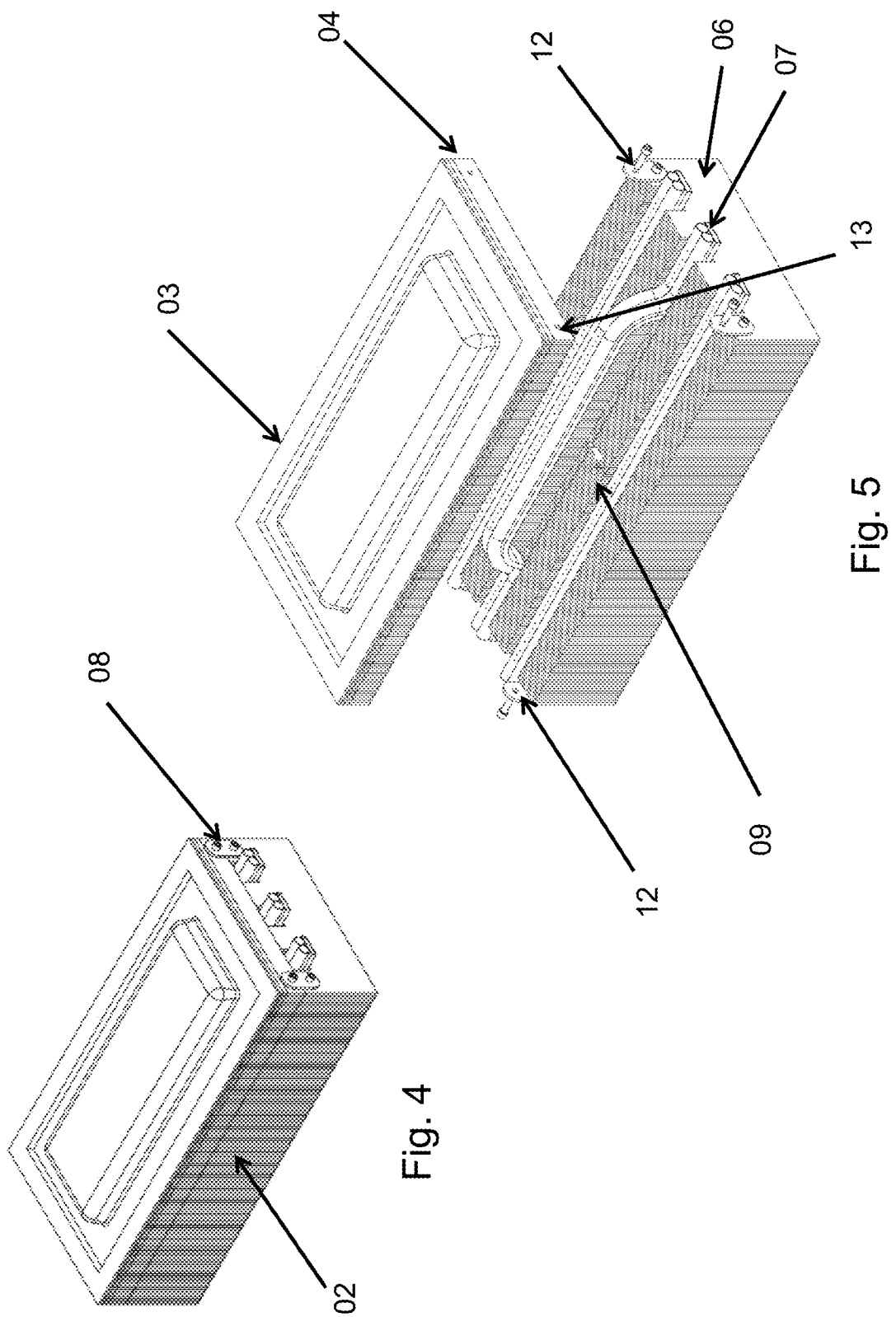

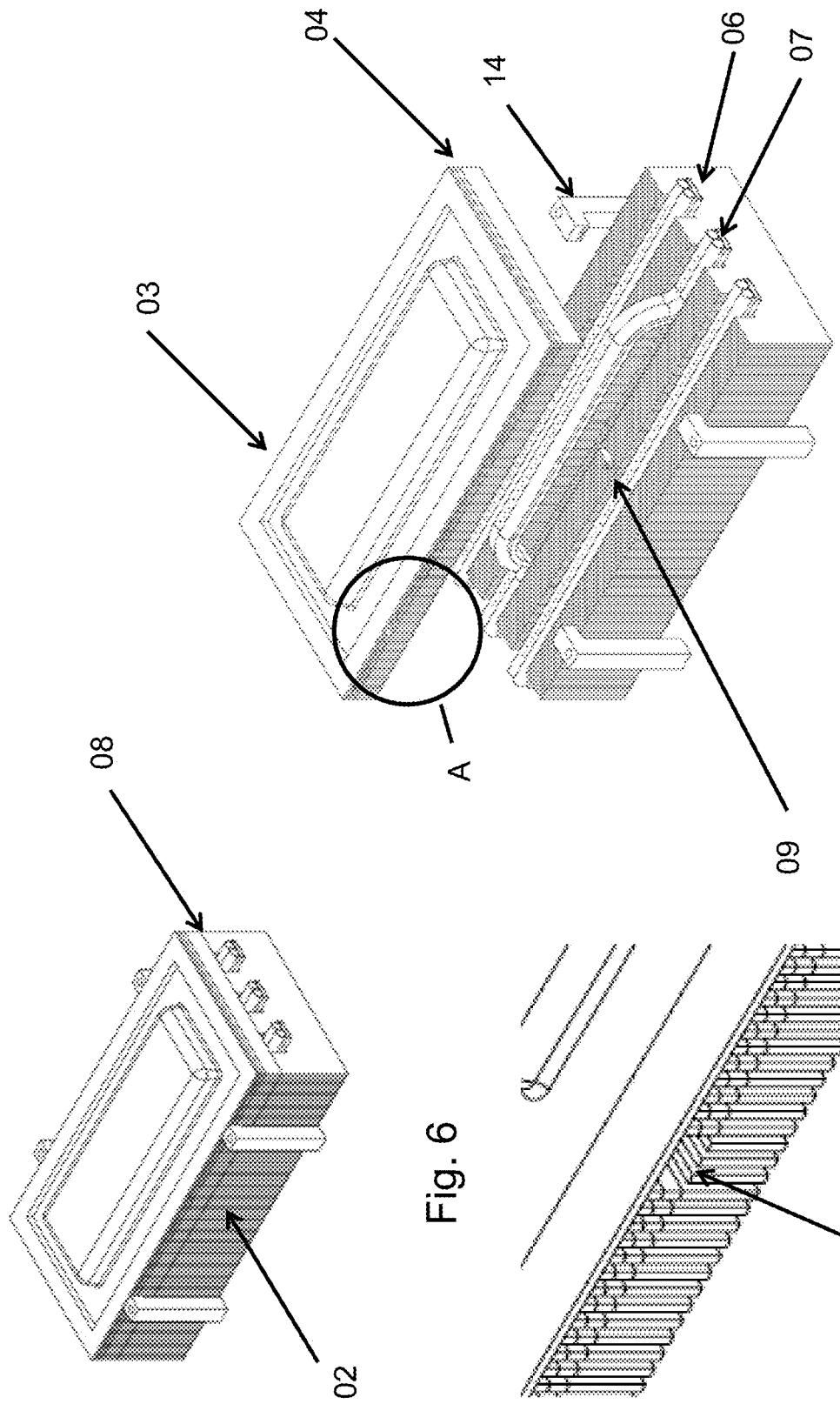

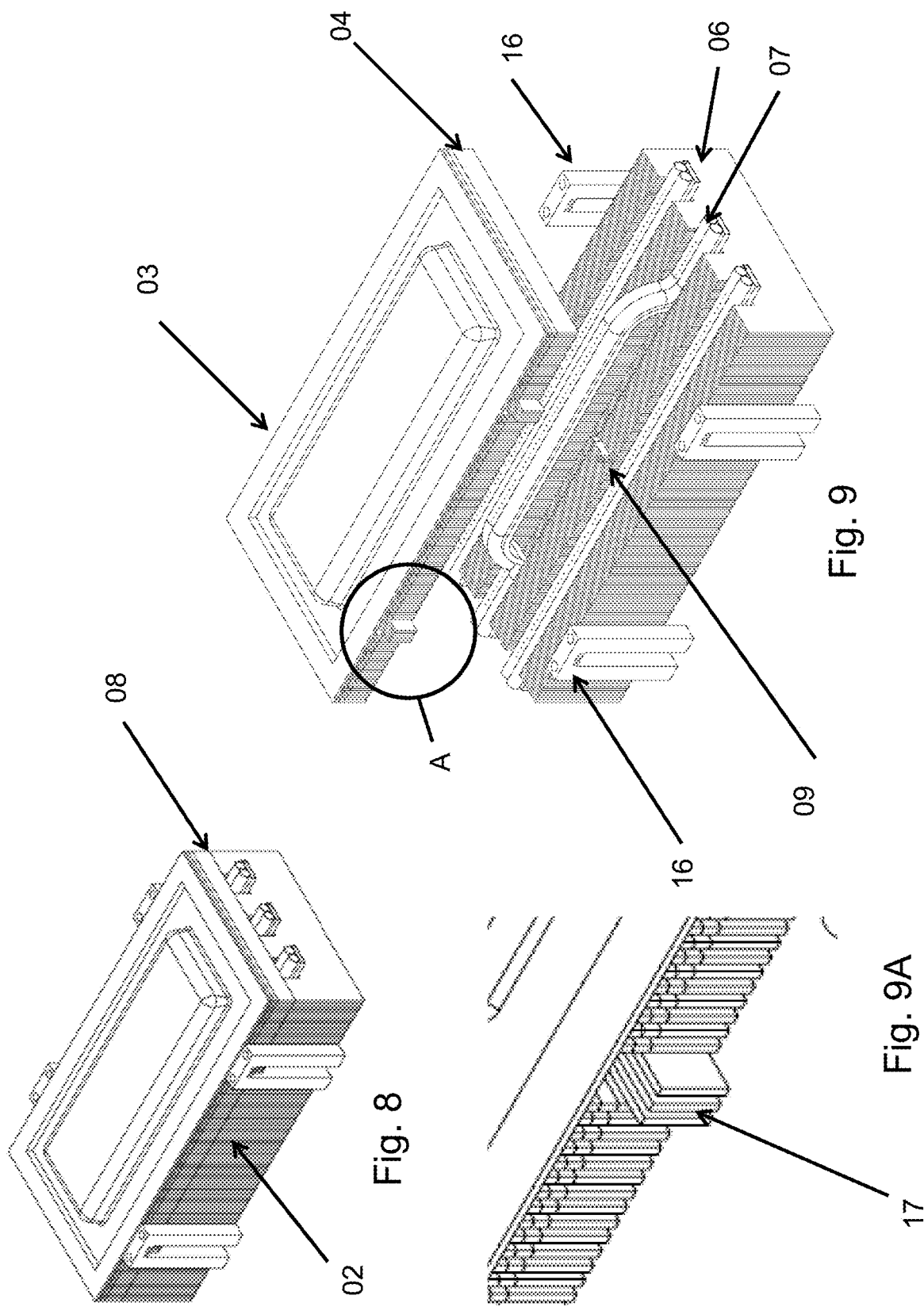

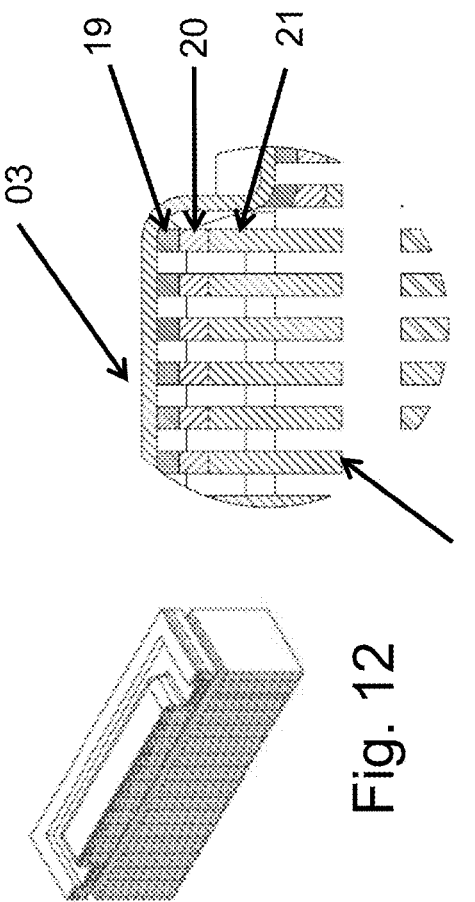
Fig. 13
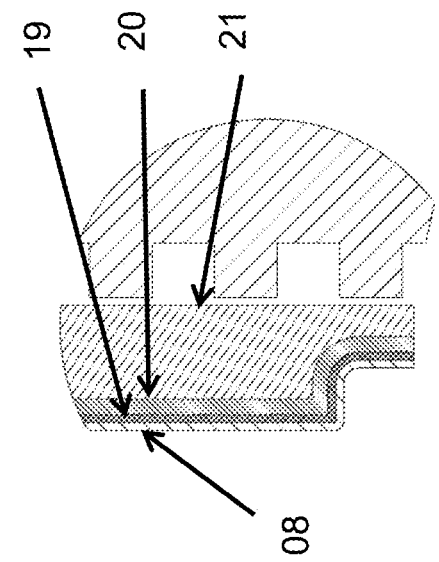
Fig. 13A
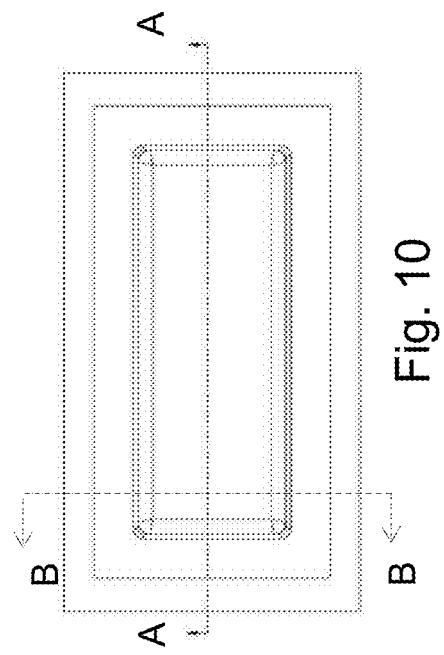
Fig. 12
Fig. 10
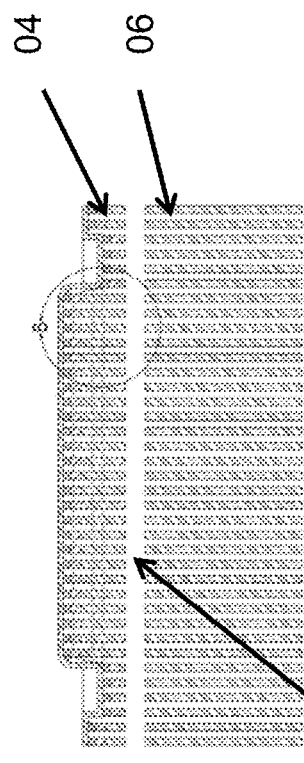
Fig. 11

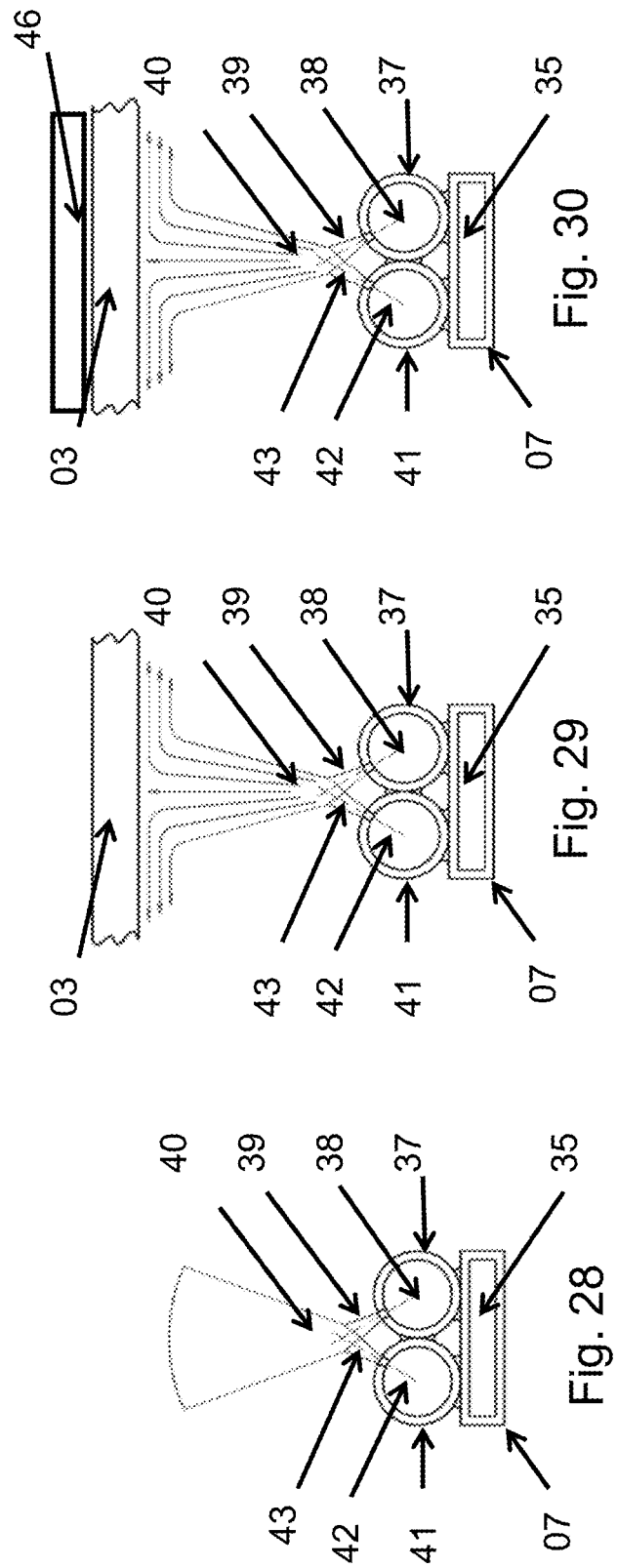

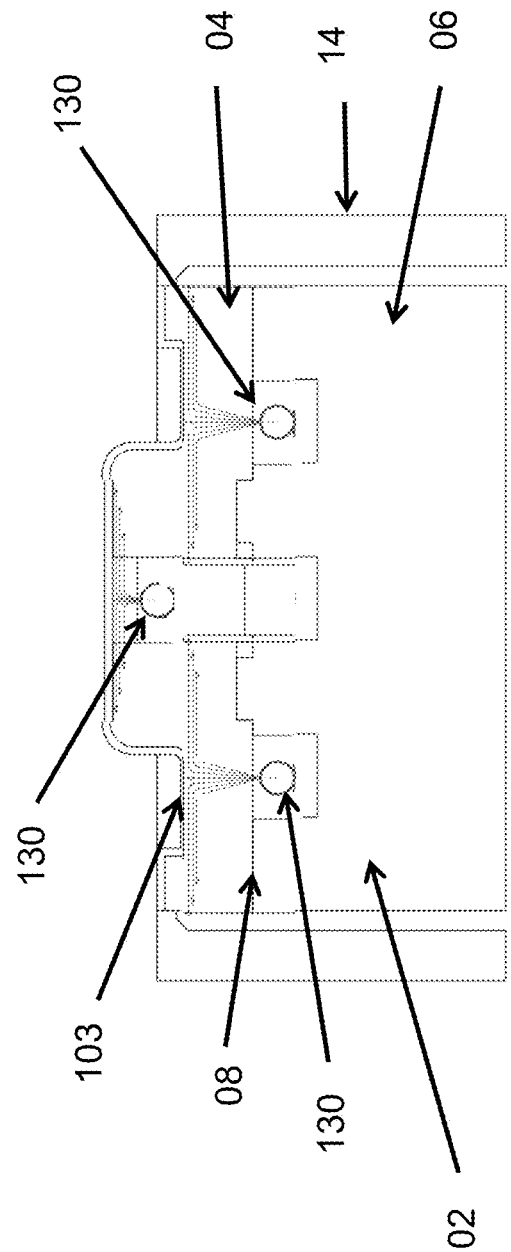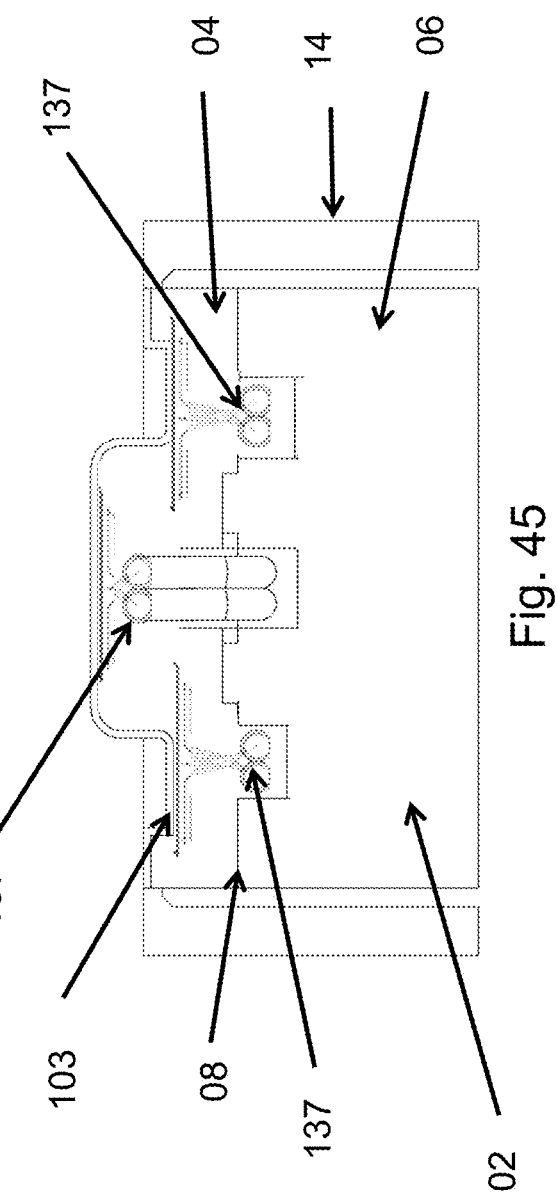

TOOL AND SHELL USING INDUCTION HEATING

CROSS REFERENCE TO RELATED APPLICATIONS

The present application is a continuation of U.S. patent application Ser. No. 14/834,834, filed Aug. 25, 2015, now U.S. Pat. No. 10,307,810, which is a divisional application of U.S. patent application Ser. No. 13/899,953, filed May 22, 2013, which claims the filing benefit of U.S. provisional application, Ser. No. 61/650,672, filed May 23, 2012, which is hereby incorporated herein by reference in its entirety.

FIELD OF THE INVENTION

The present invention relates generally to a method and system for forming a component via at least partially direct inductive heating of the blank during the forming process and/or at least partially heating a die forming shell wherein the heated shell at least partially conductively heats the material to be processed.

BACKGROUND OF THE INVENTION

It is known to form materials into structural components having different diameters and shapes via induction heating of a blank during the forming process, such as during the stamping or inflating process to form the structural component. The induction heating process generates heat within the material by inducing a current in the material, whereby the material's resistance to the electrical current generates heat as the current is passed therethrough. Examples of such induction heating processes are described in U.S. Pat. Nos. 7,269,986; 7,024,897; 7,003,996; 6,613,164 and 6,322,645, which are hereby incorporated herein by reference in their entireties.

SUMMARY OF THE INVENTION

The present invention provides a method and system for inductively heating the material during the forming process, such as by utilizing aspects of the systems described in U.S. patent application Ser. No. 12/124,354, filed May 21, 2008 (abandoned); Ser. No. 12/124,347, filed May 21, 2008, now U.S. Pat. No. 8,479,552; and/or Ser. No. 13/111,399, filed May 19, 2011 (abandoned), which are all hereby incorporated herein by reference in their entireties.

According to an aspect of the present invention, the system or method provides for selective cooling or quenching of the component that is being formed via the heated tool and shell which may have been at least partially heated via induction heating and/or at least partially heated via conductive heating from the part being formed. The cooling or quenching of the component is provided via a pressurized gas (which may also be any gas such as air or an inert gas like nitrogen or argon) line and/or a pressurized liquid or water line or combination thereof disposed in the tool. The gas line has a plurality of small ports disposed along the surface of the die forming shell of the tool and the liquid line has a plurality of small ports disposed along the surface of the die forming shell of the tool. The ports of the liquid line are at or near respective ports of the gas line, such that liquid that is discharged or sprayed from a liquid line port intersects or mixes with gas that is discharged or sprayed from a corresponding or respective gas line port. The gas, after it is discharged from the ports, is preferably supersonic, such that the liquid or water that intersects the supersonic gas flow is vaporized or atomized, whereby the gas and liquid vapor mixture that results is very cool and quickly cools or quenches the component. When the cooling/quenching process is completed (so that the component and/or the die forming shell is generally at its targeted temperature), a vacuum may be applied to the liquid lines to draw the liquid out of the lines so that water will not drip from the ports onto the component after the gas pressure and liquid pressure are deactivated.

The liquid lines and/or gas lines are disposed along the tool and may be at least partially disposed between plates or ribs that support the die forming shell (such as an upper set of plates or ribs attached to an upper shell and a lower set of plates or ribs attached to a lower shell).

In addition, the liquid or gas lines, either as dual lines or individually, may be used in a controlled fashion, where at the beginning of a controlled cool down, the gas and liquid lines may be activated for a short period of time, then turned off, and then the part that is being processed may have its temperature re-elevated to a new higher temperature (such as via induction heating of the part and or die forming shell or resistance heating). A gas line then may be activated for a short period of time to assist in controlling the temperature, and then a full liquid quench may be activated to quench or cool the temperature of the part being formed as quickly as possible.

According to another aspect of the present invention, the tool comprises an interchangeable die forming shell, with the upper and/or lower shell portions being removably attached or detachably attached at or to the upper and/or lower set of ribs or plates. The shell portion may have partial or truncated ribs or plates formed or established thereat, and the partial ribs or plates may generally align with and engage or attach at the respective upper or lower set of ribs or plates of the tool. Thus, the shell portions may be removed and replaced if worn and/or may be removed and replaced to adapt the tool for making a different component.

According to another aspect of the present invention, the ribs or plates may be formed or constructed or established at the tool and/or respective shell portions via an additive manufacturing process, such as via a laser deposition process or a spray welding process or the like. The respective shell portions support structure could then undergo machining operations to bring them to their final shape. Additionally, the die forming shell could be machined and ribs or plates (or sheets of material), could be fabricated and brazed in stacked layers in an end to end fashion to the die forming shell. Optionally, the ribs or plates may comprise two or more or layers comprising different materials that are laser deposited, spray welded, welded or brazed in layers at the tool and/or shell portion. The different materials may comprise different material types and may have different properties, such as different magnetic properties and/or different curie temperatures and/or different strengths and/or the like. The different materials are integrally or unitarily formed or established together at the shell portion, and thus may be formed or established via a common forming process.

These and other objects, advantages, purposes and features of the present invention will become apparent upon review of the following specification and drawings.

BRIEF DESCRIPTION OF THE DRAWINGS

FIG. 2 is a perspective view of the lower forming tool insert of FIG. 1, shown with an attaching mechanism for attaching the upper portion of the lower forming tool insert assembly to the lower forming tool insert support assembly, via a post hold down mechanism with side supports;

FIG. 3 is an exploded perspective view of the lower forming tool insert of FIG. 2, showing the upper portion of the lower forming tool insert assembly, lower forming tool insert half and supports, the attaching mechanism, the locating mechanism, the inductive heating coils and the cooling tubes;

FIG. 4 is a perspective view of another lower forming tool insert assembly of the present invention, shown with an attaching mechanism for attaching the upper portion of the lower forming tool insert assembly to the lower forming tool insert support assembly, via a bolted tab mechanism;

FIG. 5 is an exploded perspective view of the lower forming tool insert of FIG. 4, showing the upper portion of the lower forming tool insert assembly, lower forming tool insert half and supports, the attaching mechanism, the locating mechanism, the inductive heating coils and the cooling tubes;

FIG. 6 is a perspective view of another lower forming tool insert assembly of the present invention, shown with a different attaching mechanism for attaching the upper portion of the lower forming tool insert assembly to the lower forming tool insert assembly, via a post hold down mechanism;

FIG. 7 is an exploded perspective view of the lower forming tool insert of FIG. 6, showing the upper portion of the lower forming tool insert assembly, lower forming tool insert half and supports, the attaching mechanism, the locating mechanism, the inductive heating coils and the cooling tubes;

FIG. 7A is an enlarged perspective view of the portion A of the lower forming tool insert of FIG. 7;

FIG. 8 is a perspective view of another lower forming tool insert assembly of the present invention, shown with a different attaching mechanism for attaching the upper portion of the lower forming tool insert assembly to the lower forming tool insert assembly, via a double post hold down mechanism to extended tab from the die forming shell support mechanism;

FIG. 9 is an exploded perspective view of the lower forming tool insert of FIG. 8, showing the upper portion of the lower forming tool insert assembly, lower forming tool insert half and supports, the attaching mechanism, the locating mechanism, the inductive heating coils and the cooling tubes;

FIG. 9A is an enlarged perspective view of the portion A of the lower forming tool insert of FIG. 9;

FIG. 10 is a top plan view of a forming tool and die forming shell tool insert assembly of the present invention;

FIG. 11 is a side view section of the forming tool and die forming shell tool insert taken along the line A-A in FIG. 10;

FIG. 12 is a perspective view of the sectioned forming tool and die forming shell tool insert of FIG. 11;

FIG. 13 is an enlarged view of the upper portion of the lower forming tool insert assembly, showing the die forming shell, and a stack up of multi-material bonded support assembly;

FIG. 13A is an enlarged sectional view of the upper portion of the lower forming tool insert assembly taken along the line B-B in FIG. 10, showing a cutaway through a die forming shell support member;

FIG. 28 is a view of a combined induction heating coil and two tubes in an assembly to carry a liquid and a gas in their respective tubes, in the process of discharging the fluids to create a liquid and gas mixture, that have been braised or welded together, in accordance with the present invention, wherein the bottom cavity is configured to carry cooling water for cooling or removing heat caused by the induction heating process and wherein the top cavity is configured to carry the fluid for cooling or quenching the die forming shell;

FIG. 29 is a view of the assembly of FIG. 28, with the addition of the die forming shell that is to be temperature controlled;

FIG. 30 is a view of the assembly of FIG. 29, with the addition of the blank or formed part that is to be temperature controlled;

FIG. 34 is a view of the assembly of FIG. 33, showing where the enlarged or close-up section A for FIG. 35 is taken from;

FIG. 44 is a cutaway view of a lower portion of the die arrangement shown in FIG. 1, and a tube to carry cooling fluid and discharge a cooling fluid in an arrangement similar to what is shown in FIG. 37;

FIG. 45 is a cutaway view of a lower portion of the die arrangement shown in FIG. 1, and an inductive heating coil and multi tube assembly to carry and discharge a cooling fluid mixture in an arrangement similar to what is shown in FIG. 40;

DESCRIPTION OF THE PREFERRED EMBODIMENTS

Figure 1:
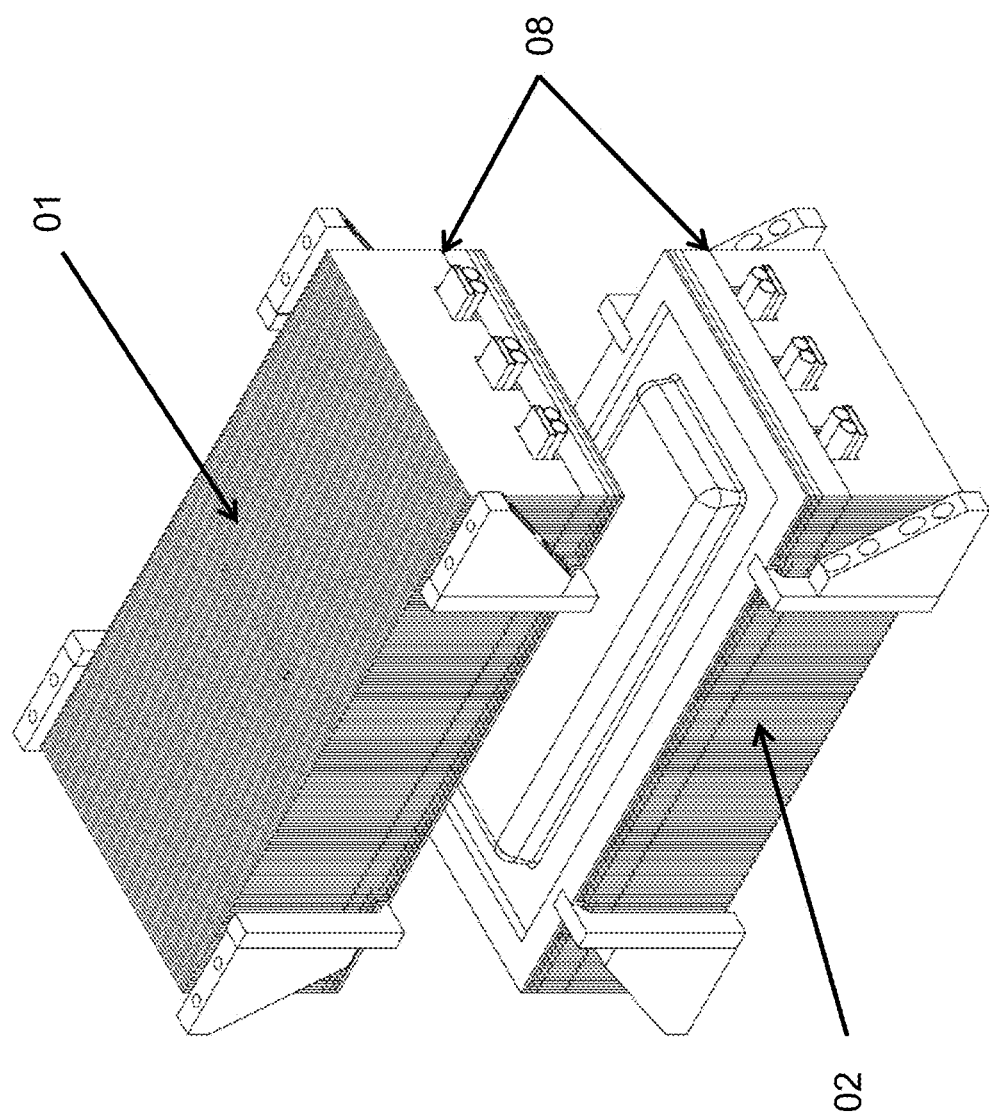
FIG. 1 is a perspective view of upper and lower forming tool insert assemblies for forming a part in accordance with the present invention.

Referring now to the drawings and the illustrative embodiments depicted therein, a method and system for forming a component via molding or forming a heated blank in a mold insert assembly is shown in FIG. 1. The heated blank may have been preheated prior to being placed in a die to be molded or formed and may have been at least partially heated in the die via at least partially inductively heating the blank, and may at least partially be heated via conductive heating from a die forming shell or molding surface that may have been at least partially inductively heated and/or resistively heated, and in addition the formed or molded blank may have been cooled in a controlled process involving a gas cooling, a liquid cooling or a combination of both through a mixing process, as discussed below. The molding or forming insert assembly of the present invention comprises an upper die half assembly 01 and a lower die half assembly 02. In addition, the mold insert assembly may comprise support mechanisms for each half that separate along parting lines 08 to enable access to the inside of the die inserts, and to provide the ability for quick die changeover and the ability to change part geometries by just replacing the upper portion of the die assemblies without replacing the entire die insert assembly.

As shown in FIG. 3, the lower die half assembly of the mold insert assembly comprises a die forming shell 03 which is used to mold or form a blank 34 that may be preheated and is placed into the die cavity. The blank may be additionally heated or temperature maintained by inductive heating coils 07 that may directly heat the blank 34 or indirectly heat the blank by conductive heat transference from a partially heated die forming shell that may be heated by the inductive heating.

Figure 36:
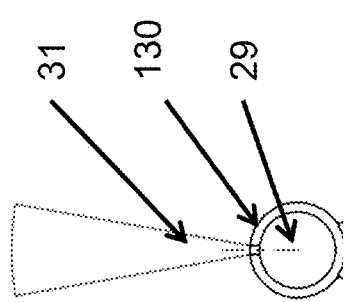
FIG. 36 is a view of a tube to carry a liquid or gas cooling fluid, in the process of discharging said fluid, in accordance with the present invention.
Figure 37:
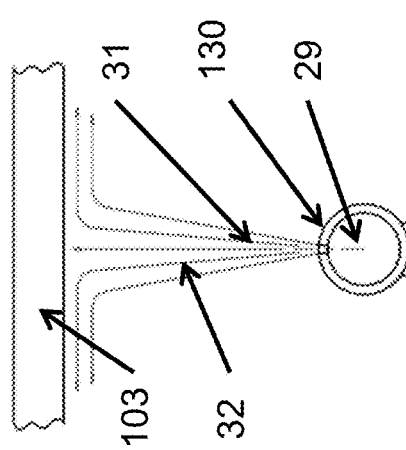
FIG. 37 is a view of the assembly of FIG. 36, with the addition of the die forming shell that is to be temperature controlled.
Figure 38:
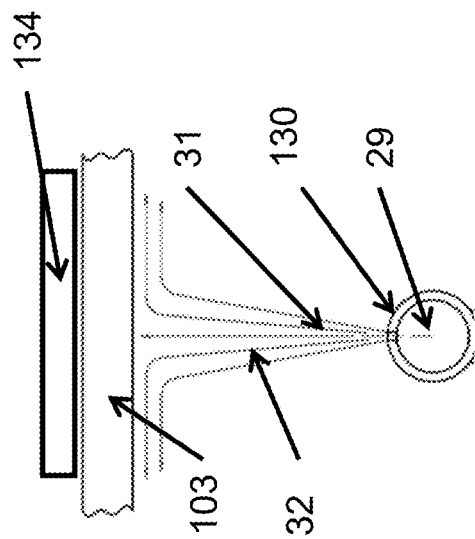
FIG. 38 is a view of the assembly of FIG. 37, with the addition of the blank or formed part that is to be temperature controlled.
Figure 41:
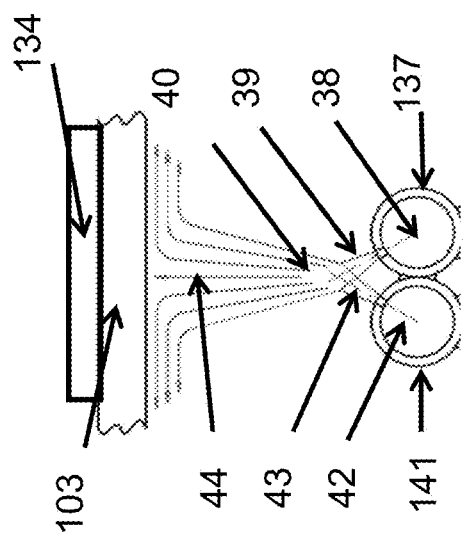
FIG. 41 is a view of the assembly of FIG. 40, with the addition of the blank or formed part that is to be temperature controlled.
Figure 40:
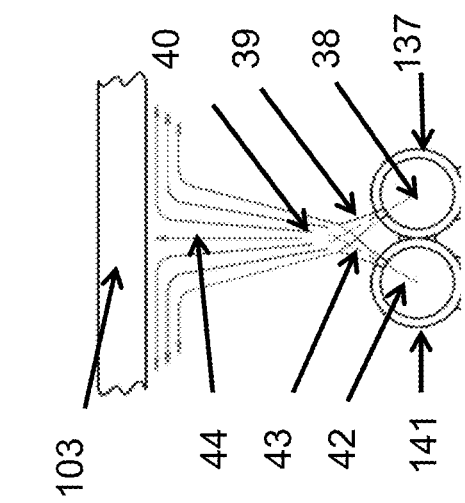
FIG. 40 is a view of the assembly of FIG. 39, with the addition of the die forming shell that is to be temperature controlled.
Figure 39:
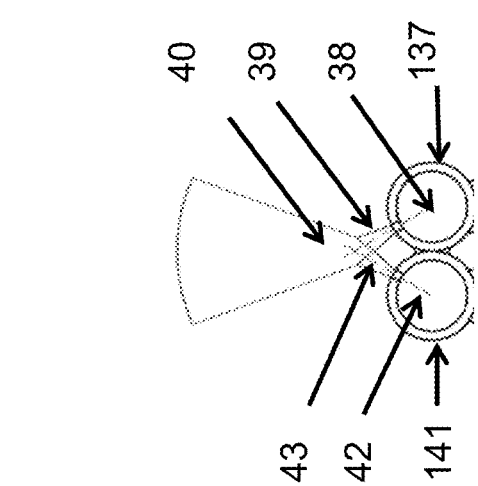
FIG. 39 is a view of two tubes in an assembly to carry a liquid and a gas in their respective tubes, in the process of discharging said fluids to create a liquid and gas mixture, that have been braised or welded together, in accordance with the present invention.

In addition, the die forming shell may be heated by electrical resistance heating via imbedding electrical resistance heating materials and/or elements into the support mechanism, or electrical resistance heating elements may be added as separate heating elements that are not part of or incorporated in the support structure. The electrical heating materials or elements are preferably part of the support structure, such as can be seen in the close-up view of FIG. 13, showing a multi-material support mechanism wherein the type of material that is chosen for the support mechanism may comprise a material 19 with preferred resistance heating properties. An electrical current may be induced or directly coupled into this separate material that makes up item 19, and that current may conductively heat the die forming shell 03. After the molding or forming process has been completed, the molded or formed blank may be cooled via a cooling medium that is designed to supply the cooling medium between the support mechanisms 04 of the die forming shell. The cooling medium system may comprise an integrated induction heating coil and multi-fluid delivery and mixing system 07, such as shown in FIG. 30, or it may comprise a very simple single tube delivery system such as shown in FIG. 36.

Although not all of the features are required for every molding or forming task, highlights of those individual features include the following. The die forming shell 03 is supported by an upper support mechanism 04 as shown in FIG. 3. The support mechanism may comprise any suitable support, such as simple plates that are contoured to the die forming shell 03 and bonded via welding, brazing or the like. These plates may be made from multi-materials that have been bonded together and machined, or the plates may be fabricated by the use of additive manufacturing techniques, such as laser deposition, plasma spray, chemical bonding and/or sintering or the like, such as can be seen in the reference example of FIG. 13, where items 19, 20 and 21 are different materials or material alloys. These different material alloys of items 19, 20 and 21 may be selected based on their ability to thermally transfer heat energy, their electrical heating properties, their inductive heating properties, their strength properties and/or their lack of thermal heat transference characteristics.

Figure 50:
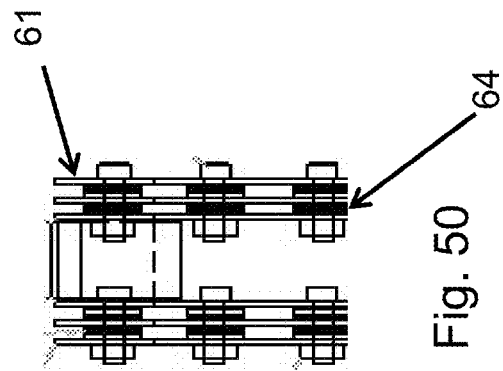
FIG. 50 is a side view of the assembly of FIG. 48, showing the supports from an edge view, in order to clearly show the spacers used to space the supports.
Figure 47:
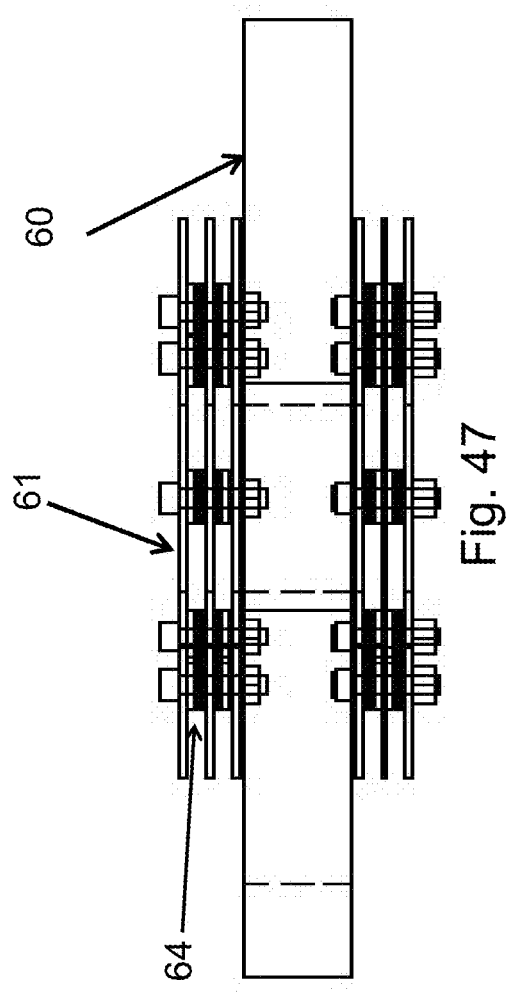
FIG. 47 is a top view of a support assembly with spacers and inductive heating coil positioned wherein the vertical supports run parallel to the inductive heating coil, similar to the arrangement of FIG. 46.
Figure 48:
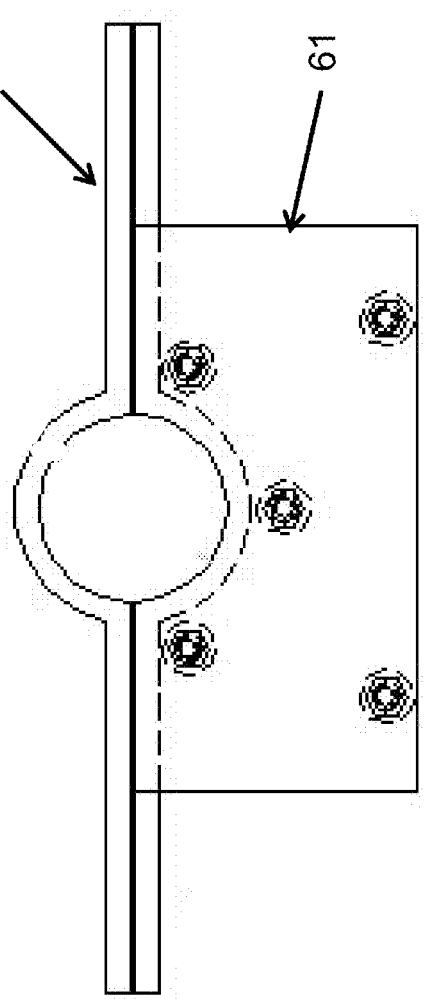
FIG. 48 is a side view of the assembly of FIG. 47, showing the upper and lower inductive heating coils and lower supports.

To assist in the description of the different types of methods that support assemblies can be configured, 01 is used to reference the upper die assemblies and 02 is used to reference the lower die assemblies, which are used for forming or molding of blanks such as shown in FIG. 1. The lower die assembly 02 comprises an upper die assembly 100 that comprises at least a die forming shell 03 and a support mechanism 04. The lower die assembly 02 comprises a lower die support mechanism 101 that also comprises at least a support mechanism or base support 06 and a locating mechanism 09 to locate the upper die assembly 100 to the lower die support mechanism 101. The upper die assembly support mechanism 04, and the lower die support mechanism can also incorporate design features that add rigidity to the structure and that may limit or eliminate the need for spacers between the supports 64 as shown in FIG. 47 and FIG. 50.

As shown in FIG. 3, the lower support elements or mechanism 04 at the lower die forming shell or shell portion may be keyed to and/or detachably attached at the lower or base die support elements or mechanism 101, whereby, when the support elements are joined or connected or engaged, the shell portion may be secured at the base support, such as via one or more brackets 05, 10, 14, 16 or the like (as shown in FIGS. 3, 5 and 7, the brackets may be configured to extend over a portion of the die assembly to retain the shell portion relative to the base or, and such as shown in FIG. 9, the bracket 16 may be configured to receive a protrusion 17 of the upper support elements when the shell portion is disposed at the base support). The brackets and engagable support elements or mechanisms allow for detachable attachment of the shell portion to facilitate changeover of dies or shells without replacing the entire support structure.

Figure 14:
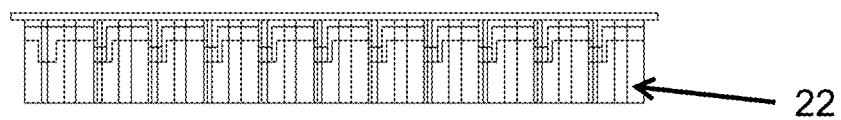
FIG. 14 is a side view of an upper portion of a lower forming tool insert assembly of the present invention, wherein the support mechanisms have been shaped into a S-shaped pattern to allow for independent support mechanisms that do not require spacers to achieve the required lateral support and allows for greater flexibility in attaching the upper portion of the lower portion.
Figure 15:
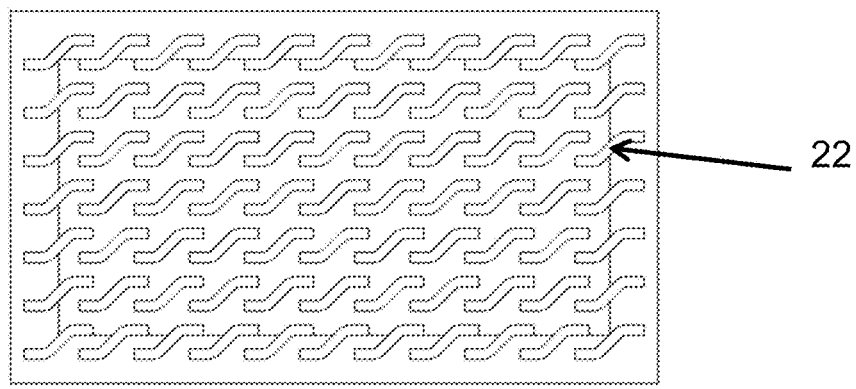
FIG. 15 is a bottom view of FIG. 14, showing the support mechanism S-shaped pattern.
Figure 16:
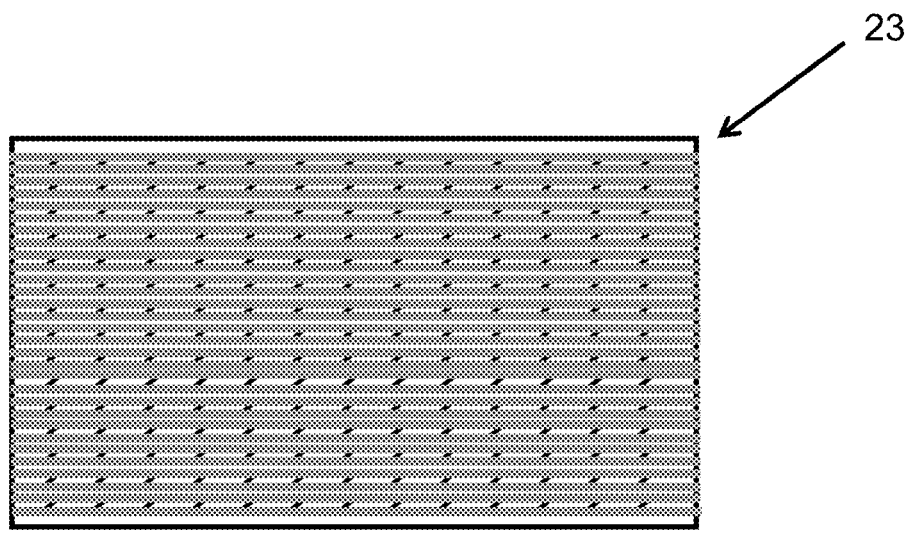
FIG. 16 is a bottom view through a straight lower portion support assembly and partially showing the view form FIG. 15, wherein this is done so the support mechanisms can float relative to the upper portion of the lower tool insert assembly and allow for thermal expansion of the joined system and allow for interchangeable forming tool insert assemblies.
Figure 17:
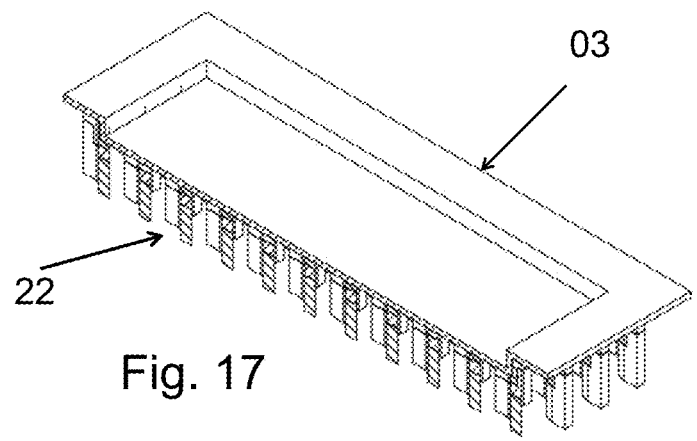
FIG. 17 is a perspective and partial sectional view of the upper portion of a lower forming tool insert assembly with the S-shaped independent support mechanisms in accordance with the present invention.
Figure 18:
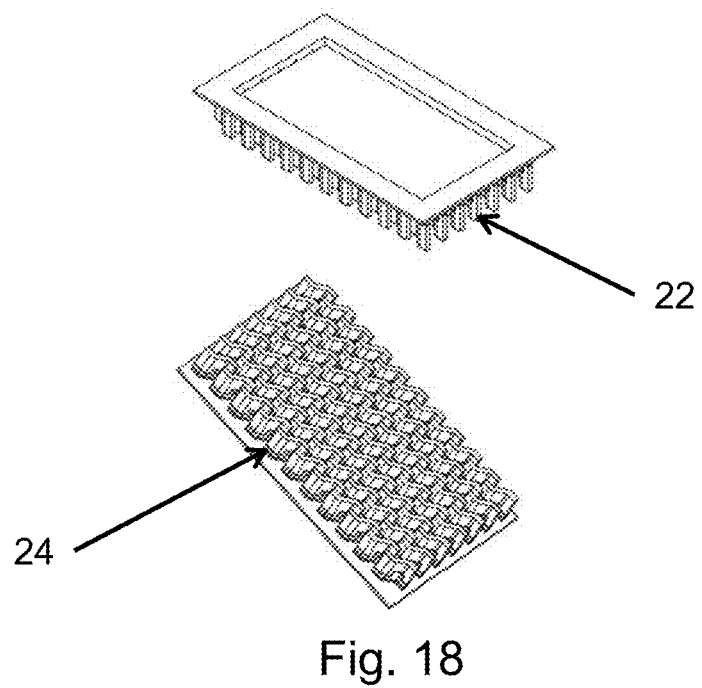
FIG. 18 is an exploded perspective view showing both the upper portion of the lower forming tool insert assembly with the S-shaped independent support mechanisms with a corresponding lower portion of a lower forming tool insert assembly with the S-shaped independent support mechanisms.
Figure 19:
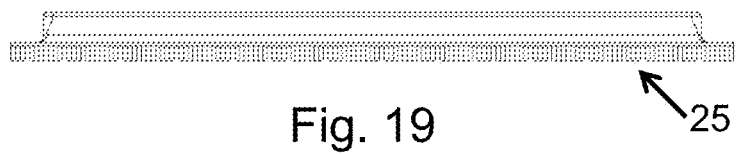
FIG. 19 is a side view of an upper portion of a lower forming tool insert assembly, with an interlocking S-shaped independent support pattern, in accordance with the present invention.
Figure 20:
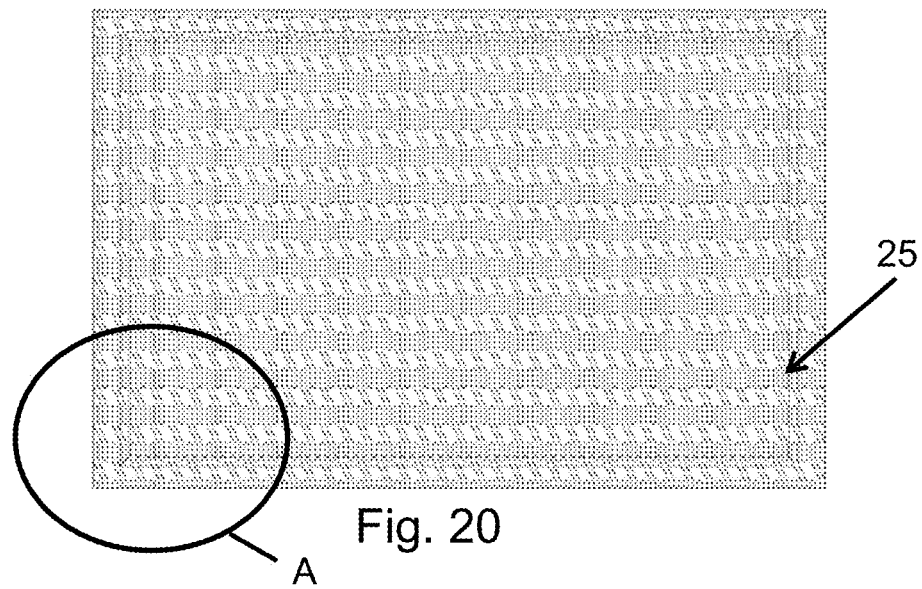
FIG. 20 is a bottom view of the assembly of FIG. 19, showing an interlocking S-shaped independent support pattern which adds to the strength of the lower forming tool insert assembly upper portion by the patterns interlocking shape and in addition are not magnetically connected by design.
Figure 21:
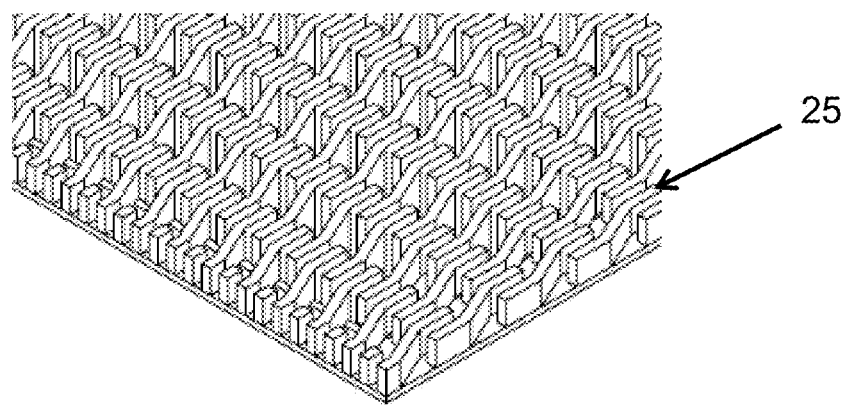
FIG. 21 is an enlarged perspective view of the interlocking support pattern from the region A of FIG. 20.
Figure 22:
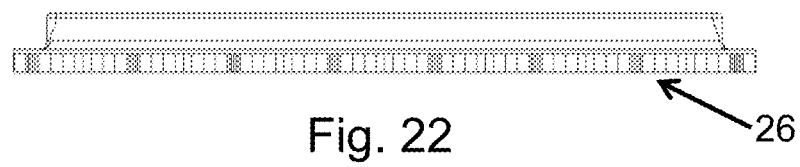
FIG. 22 is the side view of an upper portion of a lower forming tool insert assembly, with an interlocking angled and V shaped independent support pattern, in accordance with the present invention.
Figure 23:
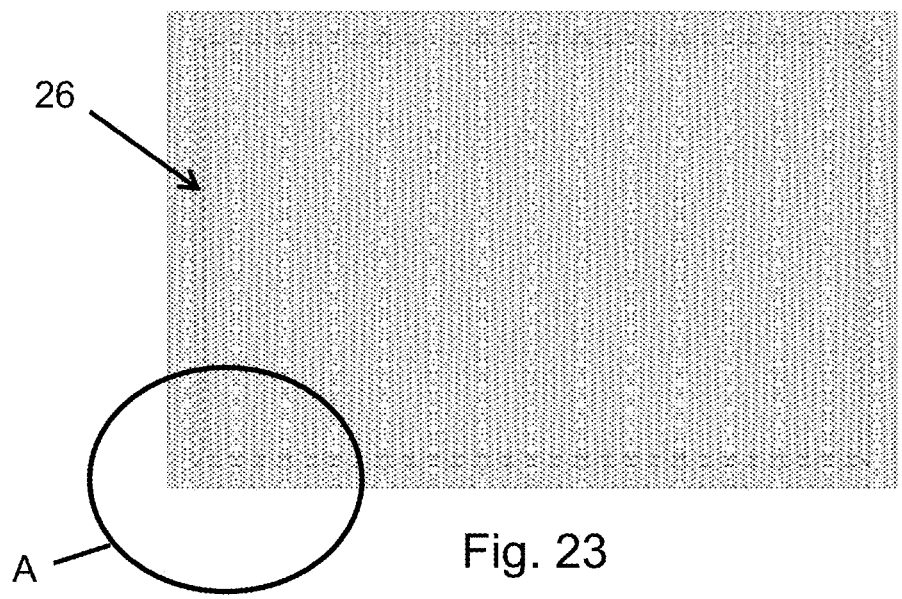
FIG. 23 is a bottom view of the assembly of FIG. 22, showing the interlocking angled and V-shaped independent support pattern which adds to the strength of the lower forming tool insert assembly upper portion by the patterns interlocking shape and in addition are not magnetically connected by design.
Figure 24:
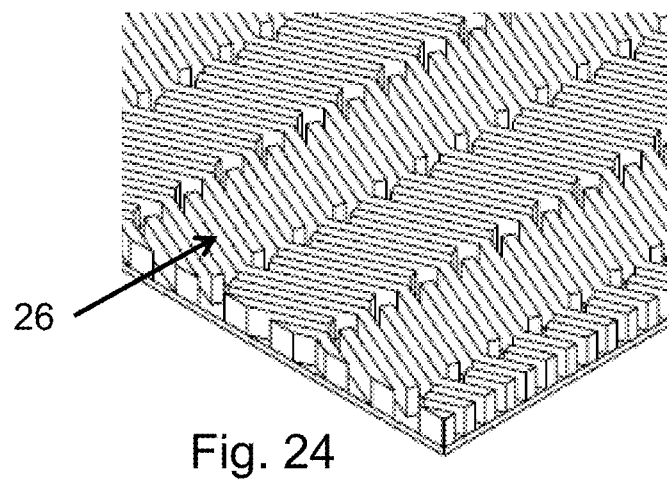
FIG. 24 is an enlarged perspective view of the interlocking support pattern from the region A of FIG. 23.

Optionally, the upper die assembly support structure 04, in addition to being constructed from multiple materials, may be constructed with shaped patterns that increase the torsional and bending properties of the die forming shell 03, and reduce the number of support elements. These support shapes are shown in FIG. 14 as item 22 and may be combined with lower die support mechanism design shapes, such as a straight lower support system 23, a complementary shape to the upper half, such as shown at 24 in FIG. 18, to be mated to item 22. Optionally, and as shown in FIGS. 19-24, the support mechanism 04 may also or otherwise be interweaved in short segments 25 and 26 so as to provide resistance to inductive heating.

In addition, the die forming shell surface 03 may be coated with a material to increase the electrical resistance of the tool surface to reduce electrical shorting between the upper die forming surface and the lower die forming shell surface thru the material that is being formed. In the case where electrical shorting is not a problem, a coating material may be added to the die forming shell surface to increase the wearability or durability of the tool or mold surface. In the case where both long tool life and electrical shorting may be a concern, a multi-material coating solution may be desired or required.

The method for cooling the die forming shell of the present invention is largely dependent on the selected material and the desired cooling profile. For example, for some materials it may not only be desirable to cool the material being molded or formed as quickly as possible for cost considerations, but it may also be necessary that the component achieve the desired material characteristics, as in the case of quench hardening of steels. In some cases, it may be desirable to cool the material under a controlled rate where the grain structure of the material would have time to form under the preferred thermal conditions. In this case, a slower cooling system may be desired or required. And in some cases, it may be desirable to cool the material from a forming or molding temperature, cool it a small amount, hold for a length of time and then reheat and then quench, such as in the case of creating a beinite grain structure in some steel materials. In such a case, the quenching may first comprise a dual fluid quenching, where one fluid is a liquid and one is a gas, that is mixed and deposited on the die forming shell under surface, and while holding at a set temperature, one of the fluids, in this case a gas, may be turned on while simultaneously applying inductive heating to the component being processed. Then the gas may be turned off and the part temperature may then be regulated, and the part may be reformed or remolded and then quickly cooled by the liquid. Thus, in this example, all three types of quenching may be used in one process. In all of these cases, it would be desirable to cool the material being formed or molded as quickly as possible for manufacturing cost concerns.

Figure 27:
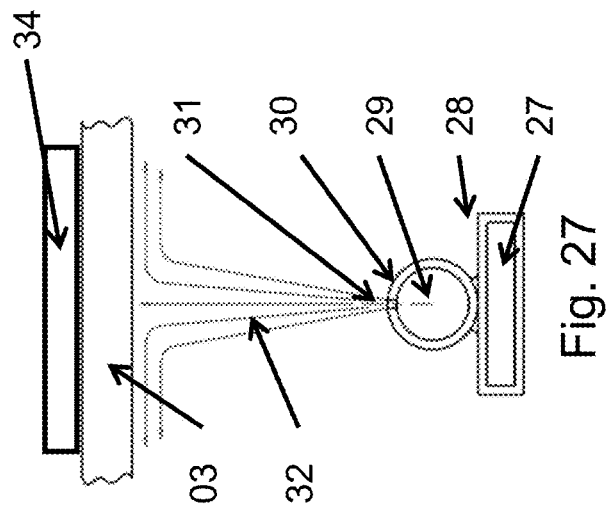
FIG. 27 is a view of the assembly of FIG. 26, with the addition of the blank or formed part that is to be temperature controlled.
Figure 26:
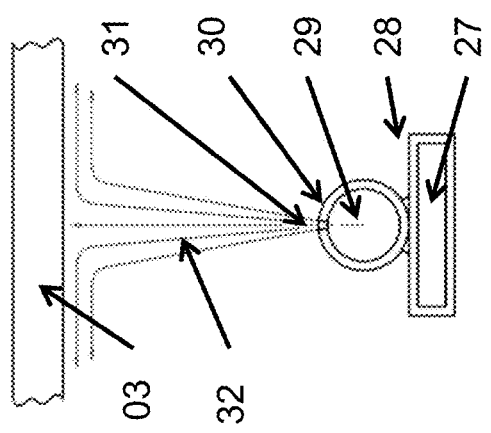
FIG. 26 is a view of the assembly of FIG. 25, with the addition of the die forming shell that is to be temperature controlled.

A single fluid example of how the cooling could take place is as follows. The upper die assembly 100 comprises a die forming shell, which under most processes needs to be cooled, so that the part 34 (FIG. 27) that is formed or molded can be conductively cooled. This cooling can be controlled or uncontrolled, but is preferably controlled, to provide consistent product quality and/or to enhance a materials characteristics such as the material's grain structure and how that grain structure is obtained. The rate or speed of cooling the product that has been formed or molded determines the method that is used. Two basic cooling methods are outlined and in both cooling methods they can either be coupled with the inductive heating coil (see item 28 of FIG. 25) or not (see item 130 of FIG. 36).

Figure 25:
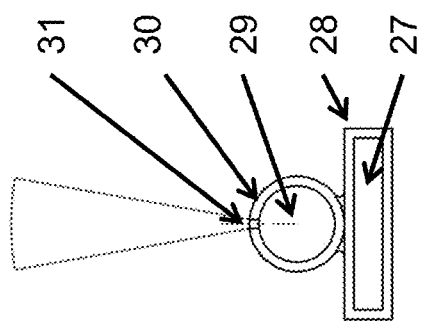
FIG. 25 is a view of a combined induction heating coil and tube assembly to carry a liquid or gas cooling fluid, in the process of discharging said fluid, that have been bonded together, in accordance with the present invention, wherein the assembly serves the dual purpose of induction heating and fluid quenching.

FIG. 25 shows an inductive heating coil 28 that also has a supply of cooling water 27 for removing heat generated by the inductive heating process, bonded to a tube 30 that is used to carry a cooling fluid medium 29 that is delivered through a hole or aperture or passageway in the tube 30. When the fluid 29 is discharged from the tube, the fluid may be sprayed in a single pattern, such as shown at 31 in FIG. 25, or may be discharged in multiple patterns such as shown at 51 in FIG. 32. These discharge holes, such as shown at item 31 and 52, can also be added along the length of the tube(s) in a similar fashion to be located in-between each support mechanism pattern that is as shown at 07 in FIG. 3. This would enable the depositing of the cooling fluid directly on the surface of the die forming shell 03 for maximum cooling capabilities.

When the fluid is discharged as shown at 32 (FIGS. 26 and 27), it is used to cool the die forming shell 03. This cooling of the die forming shell 03 then conductively cools the formed or molded blank 34. The fluid that is discharged from a single tube as shown in FIGS. 25-27 and 36-38 may be a mixture of liquid and gas, but most likely is either a liquid or a gas. The rate at which the fluid is discharged determines how quickly the die forming shell is cooled. Using one fluid tube does limit the cooling rates into two categories. For a liquid, the cooling rates from the forming or molding temperature to the approximant temperature of the liquid are generally measured in seconds and are typically in the 3 to 20 second range. For a gas, the cooling rates from the forming or molding temperature to the gas temperature are generally measured in minutes are typically in the 3 to 20 minute range.

When using a liquid, it can be difficult or challenging to control the end temperature, unless it is approximately the temperature of the liquid fluid being used to cool the die forming shell. In addition, it can be difficult or challenging to remove excess liquid from pockets or depressions in the die forming shell in the upper die surface if the tooling is constructed and run in a horizontal fashion. In the cases of using either a liquid or a gas as the cooling fluid to be deposited on the die forming shell to regulate or cool the part being formed or molded, they both have difficulty processing cooling of the die forming shell between 20 seconds and 3 minutes.

A dual fluid example of how the cooling could take place is as follows. The dual fluid system shown in FIGS. 28-30 with an inductive heating coil and the dual fluid system shown in FIGS. 39-41 incorporate a mixing of gas and liquid to achieve a higher rate, no residual liquid and easily controllable process. As shown in FIGS. 28-30, an inductive heating coil 07 that has a supply of cooling water 35 for removing heat generated by the inductive heating process, is bonded to a tube 37 for carrying a fluid 38 and a tube 41 for carrying a fluid 42. These fluids are discharged through passageways and/or holes of the tubes and create a discharge of their respective fluids 39 and 43 that are mixed together at 40. As continued in explanation and shown in FIGS. 29 and 30, this fluid mixture then comes in contact with the die forming shell 03 and cools the die forming shell, and then the part 46 is then conductively cooled. The fluids 38 and 42 used in this example could both be gases or both liquids. A preferred embodiment of this configuration is one that has one of the fluids being a liquid and another one of the fluids being a gas. The pressure used for the gas at the discharge hole is set at any suitable pressure, and is desirably over 50 psi and preferably between 50 and 250 psi. The gas becomes supersonic when discharged at these pressures and when a liquid is mixed with the gas, the liquid is absorbed or instantly absorbed in the mixing zone 40 and deposited on the die forming shell 03. In addition, supersonic air becomes super cooled. The substantially similar preferred embodiments of FIGS. 25-30 are also shown in FIGS. 36-41, with a difference being that the inductive heating is not used in the process shown in FIGS. 36-41 and therefore such an inductive heating device or coil is not shown in FIGS. 36-41.

Figure 31:
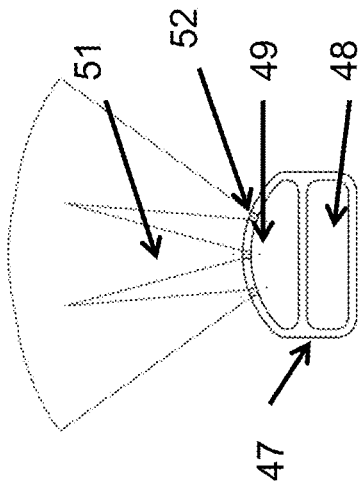
FIG. 31 is a view of another design of an extruded tube with two cavities, to serve a dual purpose of induction heating and fluid quenching in accordance with the present invention, wherein the bottom cavity is configured to carry cooling water for cooling or removing heat caused by the induction heating process and the top cavity is configured to carry the fluid for cooling or quenching the die forming shell.
Figure 32:
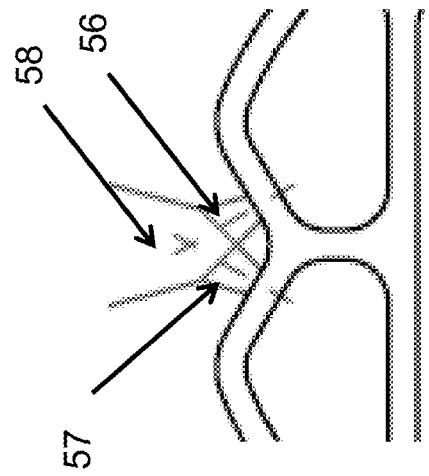
FIG. 32 is a view of the assembly of FIG. 31, with the addition of multiple holes to disperse the fluid in a different pattern.
Figure 34:
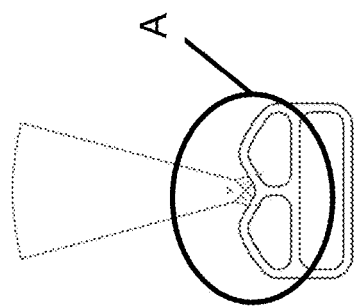
Figure 33:
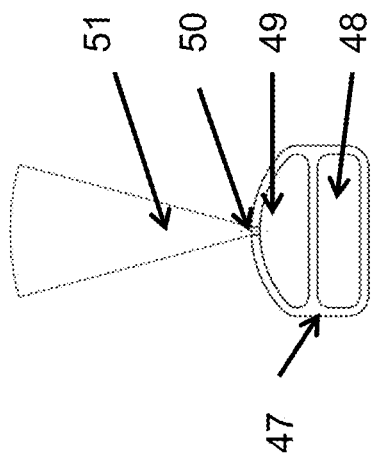
FIG. 33 is a view of another design of an extruded tube with multiple cavities, to serve a dual purpose of induction heating and mixed fluid quenching, in accordance with the present invention, wherein the bottom cavity is configured to carry cooling water for cooling or removing heat caused by the induction heating process and the top two cavity in this case is to carry two different fluids to be mixed for cooling or quenching the die forming shell.
Figure 35:
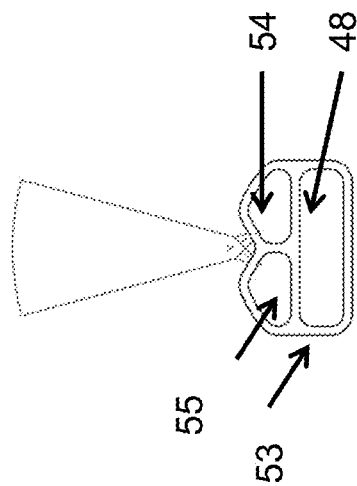
FIG. 35 is a close up view of the region or section A of FIG. 34, showing the angled surfaces and mixing location and showing the mixing intersection of the two fluids.

In addition to the coil configurations discussed above, multi-cavity tubes could be extruded and thus reduce the manufacturing costs for producing multi-cavity tubing. As shown in FIG. 31, a double cavity tube may have a dual cavity extrusion 41, a lower cavity or passageway for a supply of cooling water 48 for removing heat generated by the inductive heating process and an upper cavity or passageway for supplying a fluid 49 and discharge hole for discharging the fluid 50 and a fluid discharge stream 51. In FIG. 32, the same tubing configuration is shown, but with multiple holes to discharge the cooling fluid 49 in a wider pattern. In FIG. 33, it is shown that the extrusion has three cavities, including a lower cavity or passageway for a supply of cooling water 48 for removing heat generated by the inductive heating process, and two upper cavities or passageways for two different cooling fluids 54 and 55. In FIG. 35, a close-up of those two fluids 56 and 57 is shown as being discharged at a mixing zone 58.

Figure 42:
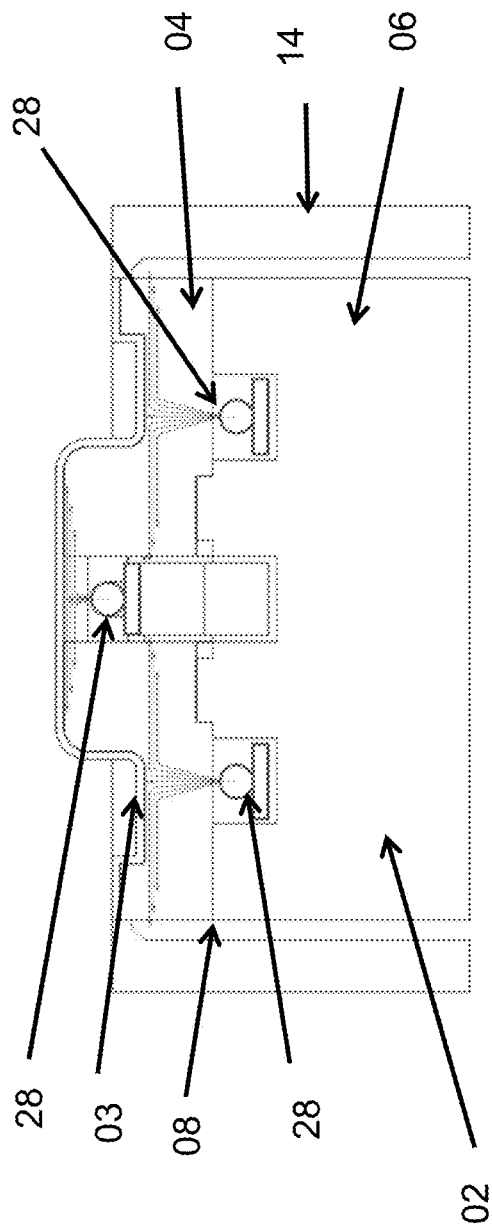
FIG. 42 is a cutaway view of a lower portion of the die arrangement shown in FIG. 1, and an inductive heating coil and tube to carry cooling fluid and discharge a cooling fluid in an arrangement similar to what is shown in FIG. 26.
Figure 43:
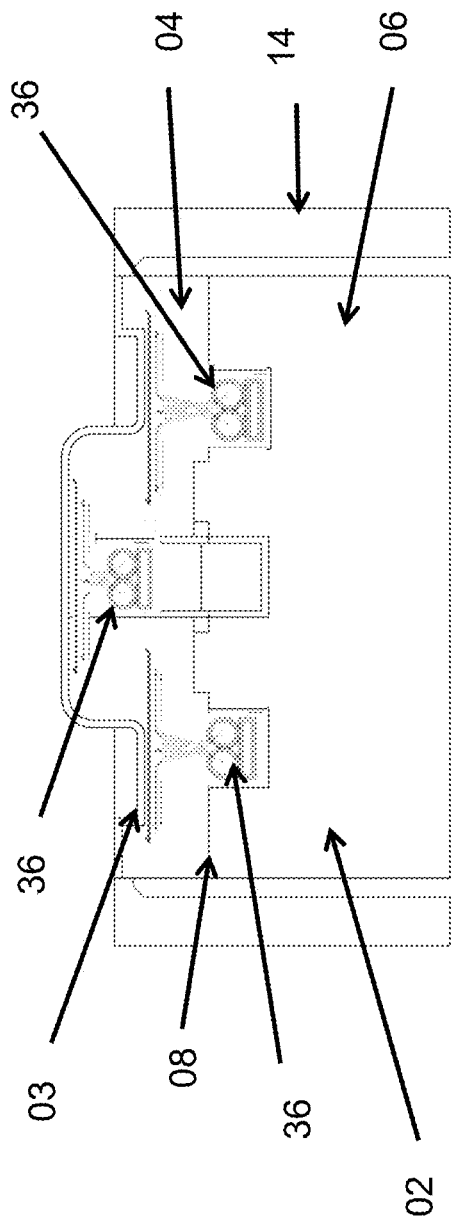
FIG. 43 is a cutaway view of a lower portion of the die arrangement shown in FIG. 1, and an inductive heating coil and multi tube assembly to carry and discharge a cooling fluid mixture in an arrangement similar to what is shown in FIG. 29.

FIG. 42 is a cross sectional view of a multi tube arrangement where an inductive heating coil and fluid carrying tube that have been bonded together with holes for discharging cooling fluid 28 is shown in a lower mold insert assembly 02. This general configuration is shown in FIG. 43, where 28 has been replaced with an inductive heating coil and dual fluid carrying tubes with discharge holes positioned to mix the two fluids 36. FIG. 44 is generally the same as FIG. 42, except that item 28 has been replaced with a tube for carrying cooling fluid with holes for discharging fluid 130 for cooling the die forming shell 103. FIG. 45 is generally the same as FIG. 43, except item 36 has been replaced with a dual tube configuration for carrying two cooling fluids with holes for discharging fluid for cooling 137 the die forming shell 103.

Figure 46:
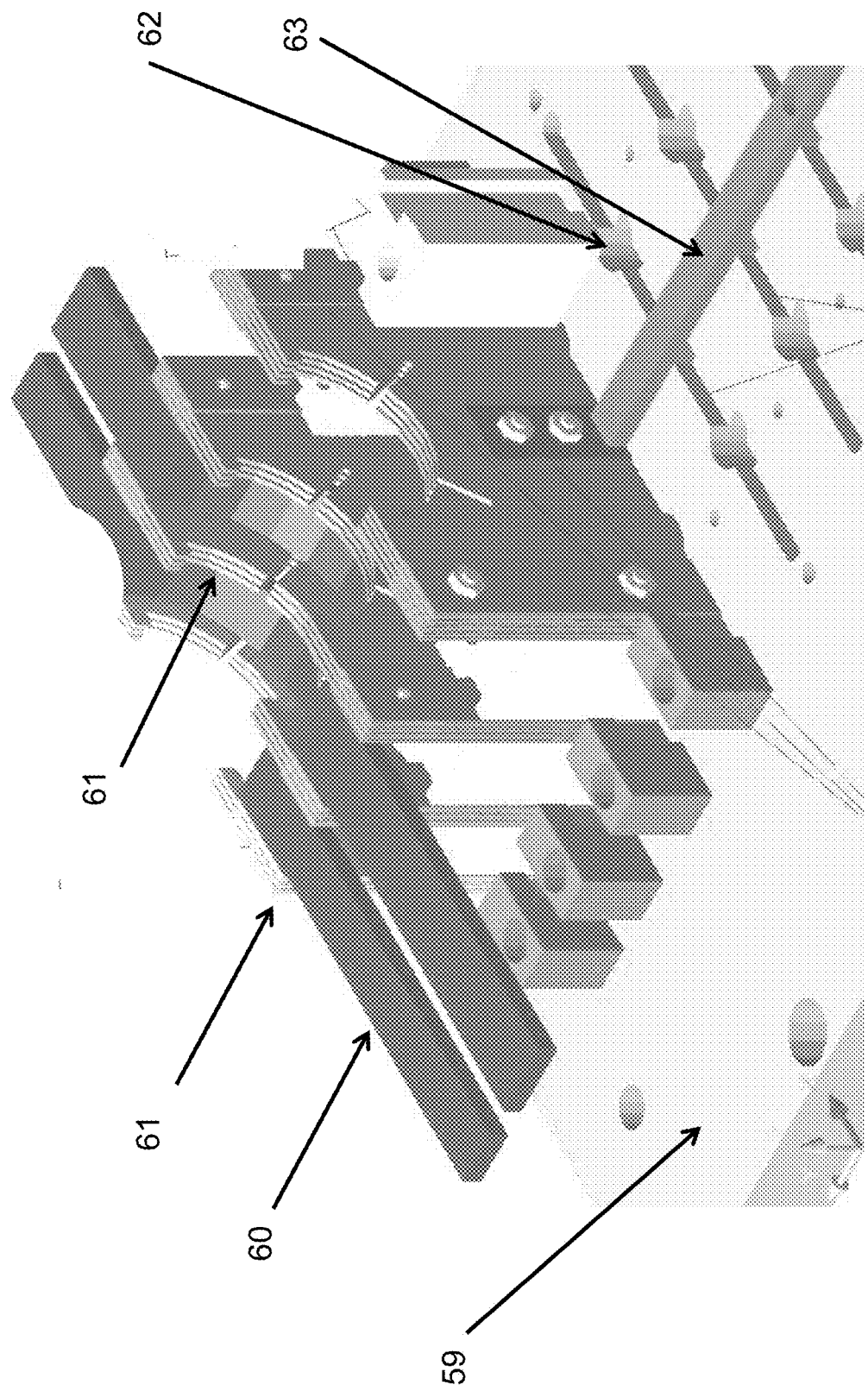
FIG. 46 is a perspective view of a coil arrangement of the present invention that runs parallel to the vertical supports with spacers and locating keys.
Figure 49:
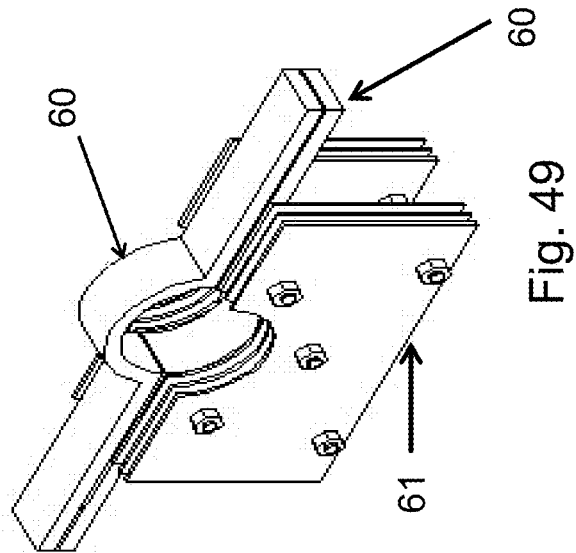
FIG. 49 is a perspective view of the assembly of FIGS. 47 and 48.

FIG. 46 shows a die forming shell support structure 61 where the support structure is parallel to the coils 60. FIG. 46 also shows a die shoe 59 that has gas cooling ports 62 for circulating a gas between the plates to cool the die forming shell and a key 63 for locating said plates. FIGS. 47-50 show the support mechanisms 61 and support spacers 64 that are used to equally space the support mechanisms.

Therefore, the present invention provides a component forming tool or forming system for forming a component from a blank, which may be preheated prior to being placed in the die cavity, whereby the tool or system includes a die forming shell for forming the component from the blank, with the die forming shell comprising a first shell portion and a second shell portion. The first shell portion is disposed at a first set of support elements and the second shell portion is disposed at a second set of support elements. A first fluid line has a plurality of first fluid discharge ports at or near the first shell portion, and a second fluid line has a plurality of second fluid discharge ports at or near respective ones of the first fluid discharge ports that are located in between the support elements. The tool or system provides pressurized fluid (such as, for example, a gas or the like) in the first fluid line that is discharged from the first fluid discharge ports, and provides pressurized fluid (such as, for example, a liquid or the like) in the second fluid line that is discharged from the second fluid discharge ports. The fluid discharged from the second fluid discharge ports of the second fluid line mixes with the fluid discharged from the first fluid discharge ports of the first fluid line to cool the first shell portion. The gas or fluid may be supersonic when discharged.

Optionally, the tool or system includes at least one induction heating coil for induction heating of a workpiece disposed within the cavity formed by the first and second shell portions when the first and second shell portions are at least partially engaged together. The first set of support elements may be configured to detachably engage with respective first support elements of the tool so that the first shell portion is detachably attached at the tool. The first set of support elements may be keyed to engage the first support elements of the tool to limit lateral movement of the first shell portion at the first support elements.

Optionally, the first set of support elements may comprise at least two layers of different materials that are at least one of (i) laser deposited at the first shell portion, (ii) spray welded at the first shell portion, (iii) welded at the first shell portion and (iv) brazed at the first shell portion. The first set of support layers may comprise different materials so that the at least two layers may have at least one of (i) different magnetic properties, (ii) different curie temperatures, (iii) different strengths and (iv) different resistance heating properties. The second set of support elements may comprise at least two layers of different materials that are laser deposited or spray welded at the second shell portion. The individual layers of the at least two layers may have at least one of (i) different magnetic properties, (ii) different curie temperatures, (iii) different strengths and (iv) different resistance heating properties.

Changes and modifications to the embodiments specifically described herein may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A component forming tool for forming a component from a blank, said component forming tool comprising:
  a die forming shell for forming the component from the blank, said die forming shell comprising a first shell portion and a second shell portion;
  wherein said first shell portion is located on a first set of multi-material support elements, wherein each support element of the first set of multi-material support elements comprises two or more materials joined together;
  wherein said first set of multi-material support elements comprises a plurality of spaced apart first support elements;
  wherein said first set of multi-material support elements are established at the first shell portion via an additive manufacturing process;
  wherein said second shell portion is located on a second set of multi-material support elements, wherein each support element of the second set of multi-material support elements comprises two or more materials joined together;
  wherein said second set of multi-material support elements comprises a plurality of spaced apart second support elements;
  wherein said second set of multi-material support elements are established at the second shell portion via the additive manufacturing process;
  a cavity formed by said first and second shell portions when said first and second shell portions are at least partially engaged together; and
  at least one induction heating coil for induction heating of a workpiece disposed within said cavity.

2. The component forming tool of claim 1, further comprising first base support elements, wherein support elements of said first set of multi-material support elements are detachably engaged with respective support elements of said first base support elements so that said first shell portion is detachably attached at said first base support elements.

3. The component forming tool of claim 2, wherein, with said first set of multi-material support elements engaged with said first base support elements, the engagement limits lateral movement of said first shell portion at said first base support elements.

4. The component forming tool of claim 3, wherein, during engagement of said first set of multi-material support elements with said first base support elements, said engagement locates said first shell portion relative to said first base support elements.

5. The component forming tool of claim 1, wherein a surface of the die forming shell is coated with a coating material with a different electrical resistivity than the die forming shell.

6. The component forming tool of claim 5, wherein said coating material has a greater electrical resistivity than said die forming shell, and wherein said coating material comprises at least one selected from the group consisting of (i) a diamond like coating material, (ii) a carbon/carbon coating material, and (iii) a non-electrically conductive coating material.

7. The component forming tool of claim 1, wherein each of said first shell portion and said second shell portion comprises two or more materials bonded together.

8. The component forming tool of claim 1, wherein said first set of multi-material support elements comprises at least two layers of different materials that are laser deposited or spray welded at said first shell portion.

9. The component forming tool of claim 1, wherein said first set of multi-material support elements comprises two or more materials bonded together.

10. The component forming tool of claim 1, wherein said first set of multi-material support elements comprises at least two layers of different materials that include at least one selected from the group consisting of (i) resistance heating materials in said first set of multi-material support elements and (ii) resistance heating elements, in order to provide conductive heating to the die forming shell that then conductively heats the blank to be formed.

11. The component forming tool of claim 1, wherein said first set of multi-material support elements comprises generally linear support elements arranged generally parallel to one another.

12. The component forming tool of claim 1, wherein said first set of multi-material support elements comprises staggered non-linear support elements.

13. The component forming tool of claim 1, wherein at least two different materials of said first set of multi-material support elements comprise at least two layers of different materials that are joined together using the additive manufacturing process.

14. The component forming tool of claim 13, wherein the additive manufacturing process comprises one selected from the group consisting of (i) laser deposition, (ii) plasma spray, (iii) chemical bonding, and (iv) sintering.

15. The component forming tool of claim 1, wherein at least two different materials of said first set of multi-material support elements comprise at least two layers of different materials that are bonded together and then machined.

16. A method for forming a component from a blank, the method comprising:
placing a blank into a first shell portion, wherein the first shell portion is located on a first set of multi-material support elements, and wherein the first set of multi-material support elements comprises a plurality of spaced apart first support elements, and wherein each of the plurality of spaced apart first support elements comprise two or more materials joined together, and wherein the plurality of spaced apart first support elements are established at the first shell portion via an additive manufacturing process;
engaging the first shell portion with a second shell portion to form a die forming shell that comprises a cavity, wherein the second shell portion is located on a second set of multi-material support elements, and wherein the second set of multi-material support elements comprises two or more materials joined together, and wherein the blank is disposed within the cavity; and
heating, via an induction heating coil, the die forming shell.

17. The method of claim 16, further comprising engaging support elements of the first set of multi-material support elements with respective support elements of first base support elements so that the first shell portion is detachably attached at the first base support elements.

18. The method of claim 17, wherein, with the first set of multi-material support elements engaged with the first base support elements, the engagement limits lateral movement of the first shell portion at the first base support elements.

19. The method of claim 18, wherein prior to the first set of multi-material support elements engaging with the first shell portion, engaging the first set of multi-material support elements comprises locating the first shell portion relative to the first base support elements.

20. The method of claim 16, wherein a surface of the first shell portion or the second shell portion is coated with a coating material with a different electrical resistivity than the respective shell portion.

21. The method of claim 20, wherein the coating material has a greater electrical resistivity than the respective shell portion, and wherein the coating material comprises at least one selected from the group consisting of (i) a diamond like coating, (ii) a carbon/carbon coating, and (iii) a non-electrically conductive coating.

22. The method of claim 16, wherein each of the first shell portion and the second shell portion comprises two or more materials bonded together.

23. The method of claim 16, wherein the first set of multi-material support elements comprises at least two layers of different materials that are laser deposited or spray welded at the first shell portion.

24. The method of claim 23, wherein the first set of multi-material support elements comprises two or more materials bonded together.

25. The method of claim 16, wherein the first set of multi-material support elements comprises at least two layers of different materials that include at least one of (i) resistance heating materials in the first set of multi-material support elements and (ii) resistance heating elements, in order to provide conductive heating to the die forming shell that then conductively heats the blank to be formed.

26. The method of claim 16, wherein the first set of multi-material support elements comprises generally linear support elements arranged generally parallel to one another.

27. The method of claim 16, wherein the first set of multi-material support elements comprises staggered non-linear support elements.

28. The method of claim 16, wherein each material of the first set of multi-material support elements is joined to another material of the first set of multi-material support elements using the additive manufacturing process.

29. The method of claim 28, wherein the additive manufacturing process comprises one selected from the group consisting of (i) laser deposition, (ii) plasma spray, (iii) chemical bonding, and (iv) sintering.

30. The method of claim 16, wherein each material of the first set of multi-material support elements are bonded together and then machined.

31. A method for forming a component forming tool used for forming a component from a blank, the method comprising:
providing a die forming shell for forming a component from a blank, the die forming shell comprising a first shell portion and a second shell portion;
establishing, via an additive manufacturing process, a first set of support elements at the first shell portion, wherein the first set of support elements comprises a plurality of spaced apart first support elements;
wherein establishing the first set of support elements at the first shell portion comprises, for each spaced apart first support element of the first set of support elements, joining two or more materials together to form a first set of multi-material support elements;
locating the first shell portion on the first set of multi-material support elements;
establishing, via the additive manufacturing process, a second set of support elements at the second shell portion, wherein the second set of support elements comprises a plurality of spaced apart second support elements;
wherein establishing the second set of support elements at the second shell portion comprises, for each spaced apart second support element of the second set of support elements, joining two or more materials together to form a second set of multi-material support elements;
locating the second shell portion on the second set of multi-material support elements; and
engaging the first shell portion with the second shell portion to form a cavity with the first and second shell portions.

32. The method of claim 31, wherein joining the two or more materials together to form the first set of multi-material support elements comprises laser depositing or spray welding two or more layers of different materials at the first shell portion.

33. The method of claim 31, wherein joining the two or more materials together to form the first set of multi-material support elements comprises bonding two or more layers of different materials together.

34. The method of claim 31, wherein the first set of multi-material support elements comprises at least two layers of different materials that include at least one selected from the group consisting of (i) resistance heating materials in the first set of multi-material support elements and (ii) resistance heating elements, in order to provide conductive heating to the die forming shell that then conductively heats the blank to be formed.

35. The method of claim 31, wherein joining the two or more materials together to form the first set of multi-material support elements comprises joining two or more layers of different materials together using the additive manufacturing process.

36. The method of claim 35, wherein the additive manufacturing process comprises one selected from the group consisting of (i) laser deposition, (ii) plasma spray, (iii) chemical bonding, and (iv) sintering.

37. The method of claim 31, wherein joining the two or more materials together to form a first set of multi-material support elements comprises bonding and machining two or more layers of different materials together.

38. The method of claim 31, further comprising engaging support elements of the first set of multi-material support elements with respective support elements of first base support elements so that the first shell portion is detachably attached at the first base support elements, and wherein, with the first set of multi-material support elements engaged with the first base support elements, the engagement limits lateral movement of the first shell portion at the first base support elements.

39. The method of claim 31, comprising coating a surface of the first shell portion or the second shell portion with a coating material with a different electrical resistivity than the respective shell portion, and wherein the coating material has a greater electrical resistivity than the respective shell portion, and wherein the coating material comprises at least one selected from the group consisting of (i) a diamond like coating, (ii) a carbon/carbon coating, and (iii) a non-electrically conductive coating.

40. The method of claim 31, wherein providing the die forming shell comprises providing each of the first shell portion and the second shell portion as a respective shell portion comprising two or more layers of materials.

* * * * *